United States Patent [19]

Yamauchi et al.

[11] Patent Number: 5,517,399

[45] Date of Patent: May 14, 1996

[54] POWER SUPPLY HAVING A CHOPPER WITH AN IMPROVED POWER FACTOR

[75] Inventors: Tokushi Yamauchi, Kadoma; Masahiro Yamanaka, Mino; Kazuhiro Nishimoto, Kashihara; Yukio Yamanaka, Kadoma, all of Japan

[73] Assignee: Matsushita Electric Works, Ltd., Osaka, Japan

[21] Appl. No.: 117,842

[22] Filed: Sep. 7, 1993

[30] Foreign Application Priority Data

Nov. 20, 1992 [JP] Japan ................................ 4-312488
Nov. 20, 1992 [JP] Japan ................................ 4-312489

[51] Int. Cl.⁶ .................................................. G05F 1/613
[52] U.S. Cl. ........................ 363/89; 313/222; 313/272
[58] Field of Search ............................. 363/89; 323/222, 323/272, 282, 284, 286

[56] References Cited

U.S. PATENT DOCUMENTS

| | | | |
|---|---|---|---|
| 4,384,321 | 5/1983 | Rippel | 363/124 |
| 4,467,268 | 8/1984 | Chambers et al. | 323/222 |
| 4,529,927 | 7/1985 | O'Sullivan et al. | 323/222 |
| 4,816,739 | 3/1989 | Sakurai et al. | 323/272 |
| 4,942,509 | 7/1990 | Shires et al. | 323/89 |
| 5,001,620 | 3/1991 | Smith | 323/89 |
| 5,073,850 | 12/1991 | Pace | 323/222 |
| 5,247,239 | 9/1993 | Yamamura et al. | 323/272 |
| 5,359,274 | 10/1994 | Bandel | 323/222 |
| 5,406,471 | 4/1995 | Yamanaka | 323/222 |

FOREIGN PATENT DOCUMENTS 370085   7/1991   Japan ............................... H02M 7/06

*Primary Examiner*—Jeffrey L. Sterrett
*Attorney, Agent, or Firm*—Kenyon & Kenyon

[57] ABSTRACT

A power supply with a full-wave rectifier and a chopper having an inductor and a transistor connected in series across the rectifier. The transistor is switched on and off providing an interrupted voltage which is applied across a smoothing capacitor, via a blocking diode, to produce a smoothed DC voltage for driving a load. When the transistor is turned on, current from the rectifier is drawn through the inductor. When the transistor is turned off, the current through the inductor is conducted, in a positive direction, to the smoothing capacitor. The inductor and parasitic capacitance inherently present in the chopper create oscillations which allow current to flow through the inductor in a negative direction. A controller turns the transistor on at a time when the current flows in the negative direction and turns the transistor off after a predetermined on-period so as to release the current through the inductor, thereby causing the current to first flow in the negative direction and then in the positive direction through the inductor during the on-period. An input current wave shaping circuit is provided so that for each on-period, the amount of current flowing continuously through the inductor in the negative direction occurring immediately after the turning on of the transistor is less than the amount of current flowing through the inductor in the positive direction.

15 Claims, 26 Drawing Sheets

CURRENT THROUGH INDUCTOR 4

VOLTAGE APPLIED ACROSS MOSFET 5

INPUT VOLTAGE

INPUT CURRENT

CURRENT THROUGH INDUCTOR

VOLTAGE APPLIED ACROSS MOSFET

CURRENT THROUGH INDUCTOR 31 AT A HIGH LEVEL OF RECTIFIER OUTPUT

CURRENT THROUGH INDUCTOR 31 AT A LOW LEVEL OF RECTIFIER OUTPUT

INPUT CURRENT TO RECTIFIER FROM AC VOLTAGE SOURCE

FIG. 30A  PULSATING DC VOLTAGE FROM 22M
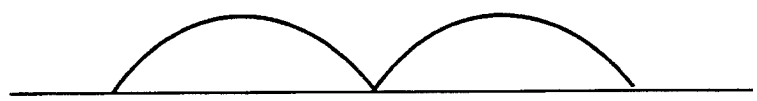
FIG. 30B
FIG. 31A
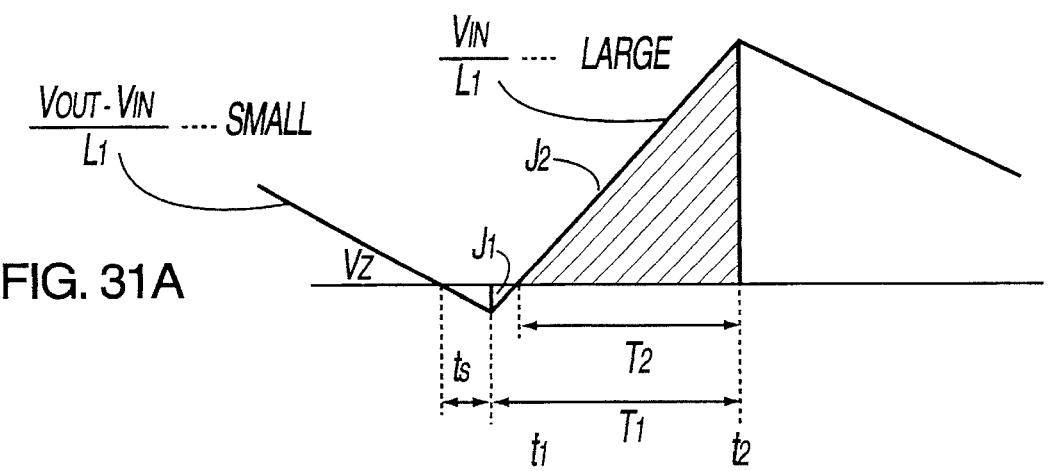
FIG. 31B
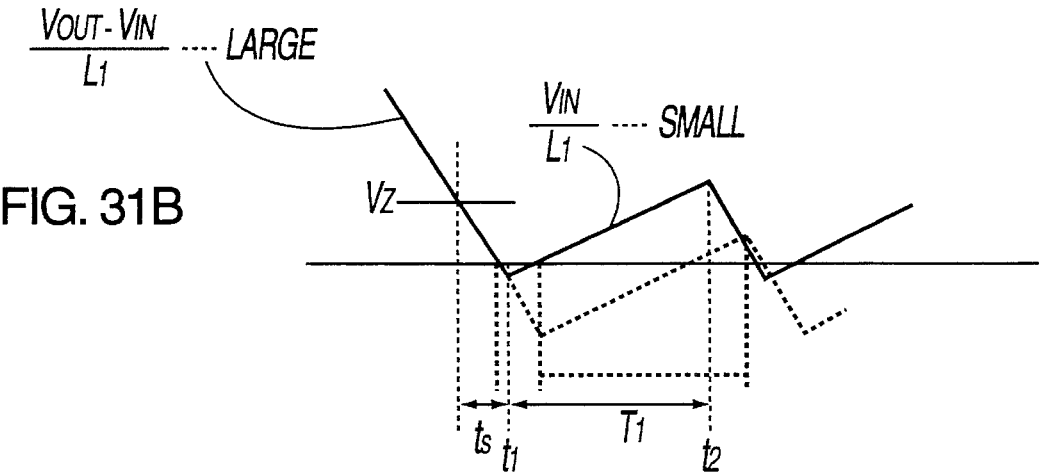

POWER SUPPLY HAVING A CHOPPER WITH AN IMPROVED POWER FACTOR

BACKGROUND OF THE INVENTION

1. Field of the Invention

The present invention is directed to a power supply, and more particularly to a power supply including a chopper which provides from an AC voltage source a DC voltage with an improved power factor.

2. Description of the Prior Art

Power supplies including a chopper are well know in the art to provide a DC voltage from an AC voltage source for driving a load such as a discharge lamp through an inverter which converts the DC voltage to another high frequency AC voltage. FIG. 1 illustrates a typical prior art power supply which comprises a fullwave rectifier 2 providing a pulsating DC output from the AC voltage source 1 such as AC mains, and a chopper CH providing a step-up DC voltage from the pulsating DC voltage. The chopper CH includes an inductor 4, a MOSFET 5, and a smoothing capacitor 7. MOSFET 5 is connected in series with the inductor 4 across the rectifier 2 and is driven to turn on and off for providing a periodically interrupted voltage which is applied through a blocking diode 6 across the smoothing capacitor 7 to provide a resulting smoothed DC voltage to a load 3. MOSFET 5 is driven by a chopper controller 10 comprising an astable multivibrator 11 (µPC1555, available from Nippon Denki Kabushiki Kaisha) for controlling to turn on and off MOSFET 5 at a fixed frequency. The multivibrator 11 receiving an operating voltage at control voltage terminal (pin no. 5) and provides high and low control signal at an output terminal (pin no. 3) at a timing determined by a time constant of resistors 12 and 13 and a capacitor 14. The control signal is fed through a buffer 15 to turn on and off MOSFET 5 at a fixed duty cycle in such a manner as to store energy from the rectifier output when MOSFET 5 is turned on to flow a current through the inductor 4 and MOSFET 5 and to release the energy from the inductor 4 into the capacitor 7 when MOSFET 5 is turned off to allow the current from the inductor 4 to continuously flow into the capacitor 7. The current flowing through the inductor 4 is shown in FIG. 2A. As seen in the figure, when MOSFET 5 is turned on at a time t1, the current responds to increase. Upon MOSFET 5 being turned off at a time t2, the current decreases to zero at time t3 and oscillates around zero level until MOSFET 5 is subsequently turned on at a time t4. This oscillation results from the fact that, as shown in FIG. 1, the inductor 4 will cooperate with parasitic capacitance inherently present in the chopper, i.e., capacitance C1 across MOSFET 5, capacitance C2 across the diode 6, and capacitance C3 across the rectifier 2 to form a resonant circuit. It is thus formed resonant circuit that allows the current to oscillate around zero level and applies a corresponding oscillating voltage to MOSFET 5 as well as diode 6 to give unduly high stress to the components. In addition to this undesired stress, the prior power supply suffers from a problem that as the oscillating current lasts over a longer dead period (t3–t4), an input current from the AC voltage source 1 will have a higher content of harmonics to be distorted thereby by a larger extent. Due to that fact that, when the pulsating DC voltage from the rectifier 2 is high, the inductor 4 sees the supplying current at a high gradient from the rectifier output and flows the releasing current at a low gradient to the smoothing capacitor 7 and that, when the pulsating DC voltage is low, the inductor 4 sees the supplying current at a low gradient from the rectifier output and flows the releasing current at a high gradient to the smoothing capacitor, the above dead period (t3–t4) will be longer at the lower rectifier output than at the higher rectifier output. Consequently, the input current is distorted by the harmonics due to the elongated dead period when the pulsating DC voltage from the rectifier is low, as shown in FIG. 3B, in relation to the input voltage from the AC voltage source, as shown in FIG. 3A, thereby lowering power factor.

In order to avoid the above problem, it is contemplated to eliminate the above dead period by controlling MOSFET 5 of the circuit of FIG. 1 to turn on before the inductor 4 has not released its energy completely, as shown in FIGS. 4A and 4B. However, with this scheme, MOSFET 5 is turned on while the diode 6 flows the current into the smoothing capacitor 7 so that the capacitor 7 acts to apply a reverse voltage to the diode 6. Consequently, a recovery current Ir will flow through diode 6 to cause increase stress thereto. Further, since the current flows constantly through the inductor 4 to continuously increase the energy ($L \times I^2 / 2$) stored therein, the inductor becomes saturated. In view of these and the above problems, it is therefore demanded to release the energy stored in the inductor before supplying energy thereto and at the same time to minimize the dead period in which the current flowing through the inductor oscillates, particularly at the low level of the pulsating DC voltage from the rectifier.

To this end, it has been proposed another prior art power supply which, as shown in FIG. 5, has a specific controller 40 in addition to a like chopper 30 of an inductor 31, MOSFET 32, blocking diode 33, and smoothing capacitor 34 in order to control MOSFET 32 to turn on immediately after the inductor 31 has released its energy. The controller 40 comprises a flip-flop 41 having its Q output connected to the gate of MOSFET 32 and a current sensor 42 which monitors the current flowing through a current sensing resistor 35 as indicative of the current flowing through the inductor 31 so as to issue a high level output to set input S of flip-flop 41 upon the current through the inductor 31 reduced to zero, thereby giving high level gate signal to turn on MOSFET 32 for storing energy into the inductor 31 by the current flowing from the rectifier 22. The flip-flop 41 has its $\overline{Q}$ output connected to a base of a bipolar transistor 48 to turn off in synchronism with the turning on of MOSFET 32. Included in the controller 40 is a current mirror of transistors 43 and 44 which provides a constant current set by DC supply 45 and a resistor 46 to charge a timing capacitor 47 by that current. The capacitor 47 is connected to noninverting input of a comparator 50 in parallel relation to the transistor 48. A voltage divider of resistors 36 and 37 is connected across the smoothing capacitor 34 to provide a corresponding voltage to inverting input of a differential amplifier 51 with a capacitor 53 connected between the inverting input and the output of the amplifier 51 as a feedback impedance. The differential amplifier 51 has its noninverting input connected to receive a fixed reference voltage from another DC supply 52 so as to provide a voltage which is a function of the difference between the inputs. The resulting voltage, which is substantially constant, is fed to inverting input of the comparator 50 as a threshold voltage VTH determining a timing at which MOSFET 32 is turned off. That is, the comparator 50 produces a high level output to reset input R of flip-flop 41 when capacitor 47 is charged up to the threshold voltage VTH of the comparator 50, thereby providing a low level gate signal from Q output to turn off MOSFET 32 for releasing the current from the inductor 31 to the smoothing capacitor 34 through diode 33. At the same time, flip-flop 41 provides a high level at $\bar{Q}$ output to turn on transistor 48. At this occurrence, capacitor 47 is shunted by transistor 48 now made conductive to discharge so as to be ready for being subsequently charged after the current sensor 42 provides a high level signal to set input S of flip-flop 41 in response to the current through the inductor 31 reducing to zero. In this manner, MOSFET 32 is turned on upon the current through the inductor 31 decreasing to zero and is kept turn on for a fixed time interval determined by a time constant of resistor 46 and capacitor 47.

It is noted in this connection that a response delay is inevitable in the circuit from an instant when the current through the inductor 31 reduces to zero to an instant when MOSFET 32 is actually turned on. In consideration of this delay, the operation of the prior power supply of FIG. 5 is explained in detail with reference to FIG. 6 which illustrates pulsating DC voltage from the rectifier 22, current flowing through the inductor 31, voltage developed across the capacitor 47, and a gate signal to MOSFET 32. At time t1, MOSFET 32 is turned on to begin supplying the current to the inductor 31 after the response delay from an instant when the current through inductor 31 decreases to zero, which condition is detected by current sensor 42. At the same time, flip-flop 41 responds to turn off transistor 48 to begin charging capacitor 47 by the current mirror. At time t2 where capacitor 47 is charged up to the threshold level VTH of comparator 50, the flip-flop 41 responds to the high level signal from the comparator 50 to the reset input R for turning off MOSFET 32 and at the same time turning on transistor 48, whereby allowing the inductor 31 to begin releasing the current from the inductor 31 for charging the smoothing capacitor 34, while discharging capacitor 47 through transistor 48 now made conductive. The charging of smoothing capacitor 34 continues until MOSFET 32 is again turned on with the delay from an instant when the current through inductor 31 decreases to zero. In this manner, this prior power supply can turn on MOSFET 32 dependent upon a timing when the current through the inductor 31 decreases to zero and therefore reduce the dead period in which the current through the inductor oscillates.

Nevertheless, this prior power supply still suffers from a problem in that the input current wave form is distorted or is not well conformed to the input voltage at a period Tx, as shown in FIG. 7C, which corresponds to a low level range of the pulsating DC voltage from the rectifier 22. Since the current through the inductor goes negative due to the resonant circuit inevitably formed in the chopper circuit and the response delay from the instant when the current decreases to zero and the time when MOSFET 32 is actually turned on, the inductor 31 always flows the current firstly in the negative direction. It should be noted in this connection that a gradient of the current flowing through the inductor when supplying the energy to the inductor from the rectifier is expressed by VIN/L (wherein VIN is the input voltage to the chopper CH from rectifier 22 and L is an inductance of the inductor) and the current flowing through the inductor 31 when releasing the energy from the inductor is expressed by (VOUT−VIN)/L (wherein VOUT is an output voltage of the chopper). Since VOUT is kept at substantially a constant level, it is known from the above relations that when the pulsating DC voltage from the rectifier 22 is around a high level (FIG. 7A), the supplying current increases at a great gradient and releasing current decreases at a less gradient, and that when the pulsating DC voltage is around a low level (FIG. 7B), the supplying current increases at a low gradient and the releasing current decrease at a high gradient. This means that, within the same response delay ts after the current through the inductor decreases to zero, the releasing current will flow in the negative direction to a greater extent (FIG. 7B) and increase slowly at the lower rectifier output (FIG. 7B) than at the higher rectifier output (FIG. 7A). Consequently, within the fixed ON-period T1 of MOSFET 32 the amount J1 of the current continuously flowing in the negative direction immediately after the turn on of MOSFET 32 becomes greater than the amount J2 of the current flowing in the positive direction of which duration is indicated by T2 in the figures when the rectifier output is low, as shown in FIG. 7B. In other words, the effective duration T2 in which the positive current flows through the inductor to store the energy therein reduces as the rectifier output becomes lower, thereby failing to establish the relation of J1<J2. It is the duration Tx where J1≦J2 that the input current wave is not well conformed to the input voltage to cause undesirable harmonics and results in lowered power factor. In this sense, this prior power supply is also found not to be successful in eliminating undesired harmonics particularly around the low level output of the rectifier to the chopper and therefore in improving the power factor.

SUMMARY OF THE INVENTION

In view of the above problems, the present invention has been accomplished to present a power supply for providing a DC voltage from an AC voltage source with an improved power factor. The power supply of the present invention comprises a fullwave rectifier providing a rectified pulsating DC voltage from an AC power source and a chopper having an inductor and a switching element which are connected in series across the rectifier. The switching element is driven to turn on and off for providing a periodically interrupted voltage which is applied through a blocking diode across a smoothing capacitor to produce a smoothed DC voltage for driving a load. The inductor stores energy from the rectifier in response to the switching element being turned on and releases the energy in response to the switching element being turned off while flowing a current through the inductor in a positive direction. The inductor cooperates with parasitic capacitance inherently present in the chopper to form an oscillation circuit which admits the current to flow through the inductor in a negative direction. A current sensor is provided to sense the current flowing through the inductor and issues a start signal upon the current decreases to a certain level. Included in the power supply is a controller which responds to the start signal for turning on the switching element at a timing when the current flows in the negative direction and which subsequently turns off the switching element after a predetermined ON-period so as to release the current from the inductor, thereby causing the current to flow firstly in the negative direction and then in the positive directions through the inductor during the ON-period. The power supply is characterized to include an input current wave shaping circuit which establishes a relation that, for each of the ON-period of the switching element, an amount of the current flowing continuously through the inductor in the negative direction occurring immediately after the turn on of the switching element is always smaller than an amount of the current flowing continuously through the inductor in the positive direction occurring immediately thereafter. With the inclusion of the input current wave shaping circuit, it is possible to flow the current through the inductor in the positive direction in a greater amount than in the negative direction even when the pulsating DC voltage from the rectifier is in a low level range, thereby minimizing undesired harmonics in the input current from the AC voltage source. Therefore, the input current waveform can be well conformed to the input voltage waveform so as to improve a power factor of the power supply, which is therefore a primary object of the present invention.

In preferred embodiments, the input current wave shaping circuit is cooperative with the controller to operate the switching element in such a manner that the ON-period is made greater as the pulsating DC voltage from the rectifier becomes lower. Consequently, the inductor can flow the current in the positive direction in an added amount by extending the ON-period of the switching element in compensation for the reduced amount of the current in the positive direction which appears when the pulsating DC voltage from the rectifier decreases, which is therefore another object of the present invention.

In other preferred embodiments, the input current wave shaping circuit is configured to have at least one additional inductor connected in series with the first inductor, a bypass switch connected across the additional inductor, and a voltage monitor connected to the fullwave rectifier to give a monitored voltage indicative of the pulsating voltage from the rectifier. A comparator is provided to compare the monitored voltage with a predetermined reference voltage to produce a shunt signal when the monitored voltage decreases to the reference voltage. The shunt signal actuates to close the bypass switch so as to bypass the additional inductor and disconnect it from the first inductor, thereby lowering the inductance of the chopper and therefore increasing the current flowing through the first inductor in the positive direction during the ON-period of the switching element. In this manner, the current is made to flow in the positive direction at an increasing gradient as the pulsating DC voltage decreases to thereby give added amount of the current flowing in the positive direction in compensation for the reduction in the current occurring in the low level range of the pulsating DC voltage from the rectifier, which is therefore a further object of the present invention.

Alternately, the input current wave shaping circuit may be configured to include at least one additional inductor which is connected in series with the first inductor, additional switching element connected in series with the additional inductor in parallel with the first switching element across the fullwave rectifier, and a voltage monitor connected to the fullwave rectifier to give a monitored voltage indicative of the pulsating DC voltage. A selector is provided to selectively enable one of the first and additional switching elements. A selector controller is connected to actuate the selector for selectively enabling one of the first and additional switching elements depending upon the level of the monitored voltage in such a manner that one of the first and additional inductors is made responsible for storing the energy in order to decrease the inductance of the chopper and therefore increase the current flowing through the inductor as the monitored voltage decreases. Consequently, it is also possible to flow the current in the positive direction at an increasing gradient as the pulsating DC voltage decreases to thereby increase the amount of the current flowing in the positive direction in compensation for the reduction in the current which would otherwise occur in the low level range of the pulsating DC voltage from the rectifier, which is therefore a still further object of the present invention.

In further embodiments, the input current wave shaping circuit is configured to comprise a voltage monitor connected to the rectifier to give a monitored voltage indicative of the pulsating DC voltage from the rectifier, and an adjustor which varies the inductance of the inductor in such a manner as to increase the current flowing in said positive direction during the ON-period of the switching element as the monitored voltage decreases. For this purpose, a secondary winding is magnetically coupled to the inductor of saturable type and is controlled to flow a varying current depending upon the pulsating DC voltage from the rectifier, whereby varying the inductance of the inductor to increase the current flowing in the positive direction as the pulsating DC voltage decreases, which is therefore a still further object of the present invention.

In still further embodiments, the input current wave shaping circuit is configured to comprise a current monitor giving a monitored voltage indicative of the current flowing through the inductor, and a voltage monitor providing a varying reference voltage which is indicative of the pulsating DC voltage from the fullwave rectifier and which increases as the pulsating DC voltage decreases. A comparator is provided to compare the monitored voltage with the varying reference voltage so as to issue the start signal upon the monitored voltage decreasing to the reference voltage. The comparator is connected the controller so that the controller responds to the start signal to turn on said switching element earlier as the pulsating DC voltage decreases in such a manner that the switching element is turned on at a timing immediately after the current flowing through the inductor decreases to zero irrespective of varying level of the pulsating DC voltage. Therefore, it is possible to minimize the amount of the current flowing through the inductor in the negative direction at the beginning of the ON-period when the pulsating DC voltage from the rectifier is in the low level range, whereby assuring to flow the current in the positive direction in a greater amount than in the negative direction during the ON-period of the switching element, which is therefore a still further object of the present invention.

In other preferred embodiments, the input current wave shaping circuit is configured to comprise a current monitor which provides a monitored voltage indicative of said current flowing through said inductor, and a voltage monitor providing a varying first voltage which is indicative of the pulsating DC voltage from the rectifier and which decreases as said pulsating DC voltage increases. A comparator is provided to compare the monitored voltage with a predetermined level to issue the start signal when the current flowing through the inductor decreases to substantially zero level. Also included is a timer which receives the start signal from the comparator and transfers the start signal to the controller with a delay of which duration duration decreases as the first voltage increases such that said controller responds to turn on said switching element earlier as said pulsating DC voltage decreases. Also with this arrangement, it is possible to minimize the amount of the current flowing through the inductor in the negative direction at the beginning of the ON-period when the pulsating DC voltage from the rectifier is in the low level range, thereby assuring to flow the current in the positive direction in a greater amount than in the negative direction during the ON-period of the switching element, which is therefore a still further object of the present invention. The current monitor may comprises a current sensing resistor connected in series with the inductor and may be alternately a secondary winding which is magnetically coupled to the inductor to induce a voltage corresponding to the current flowing through the inductor.

These and still further objects and advantageous features of the present invention will become apparent from the following description of preferred embodiments when taken in conjunction with the attached drawings.

BRIEF DESCRIPTION OF THE DRAWINGS

FIG. 30A and 30B illustrate waveforms of a pulsating DC voltage from a rectifier and a varying threshold voltage for determination of a timing at which a switching element is turned on in the circuit of FIG. 29, respectively;

FIG. 31A and 31B illustrate enlarged waveforms of a current flowing through an inductor of the power supply of FIG. 29, respectively when the pulsating DC voltage from the rectifier is high and low, respectively;

DETAILED DESCRIPTION OF THE PREFERRED EMBODIMENTS

FIRST EMBODIMENT <FIGS. 8 TO 10>

Figure 8:
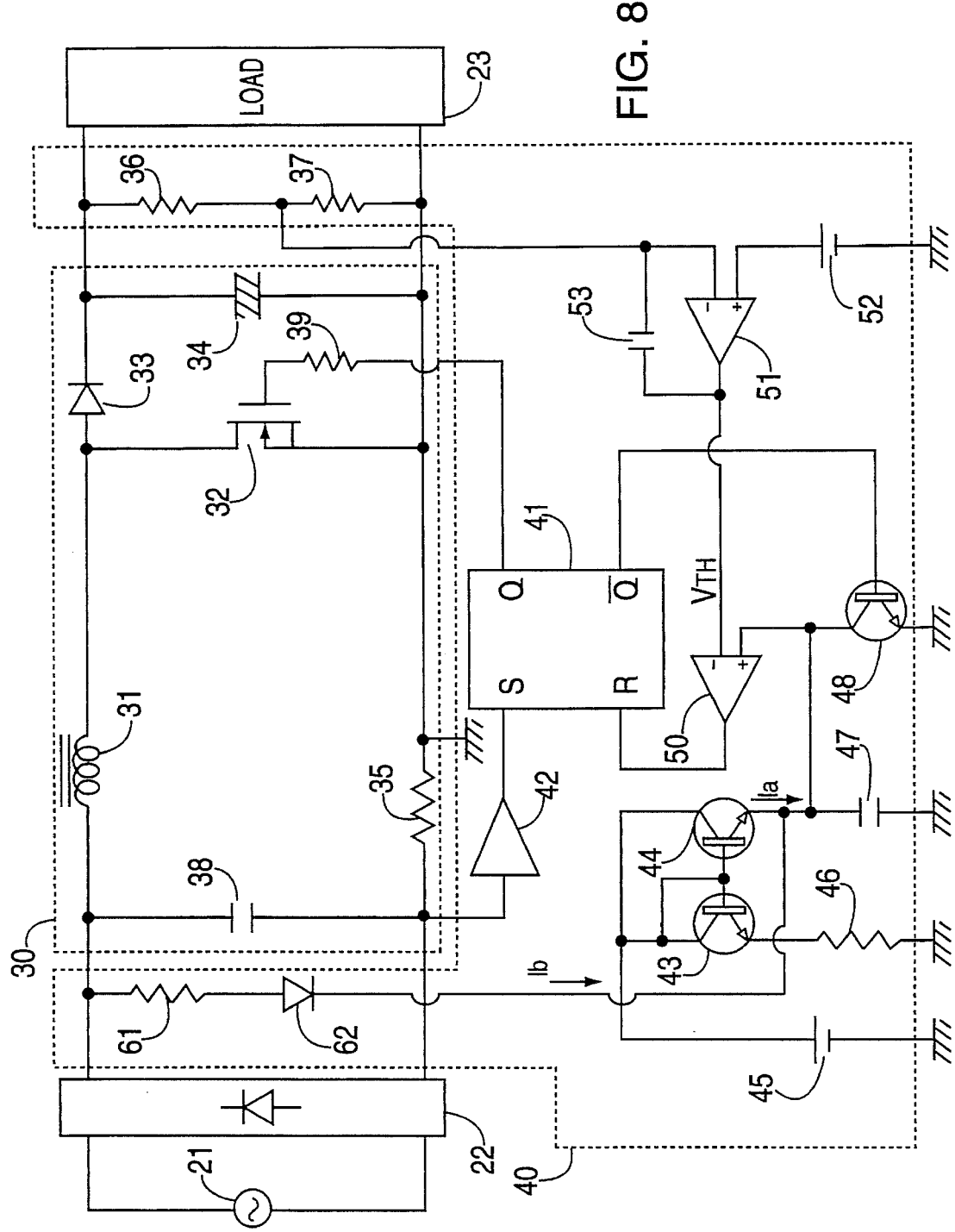
FIG. 8 is a circuit diagram of a power supply in accordance with a first embodiment of the present invention.

Referring now to FIG. 8, there is shown a power supply in accordance with a first embodiment of the present invention. The power supply comprises a fullwave rectifier 22 in the form of a diode bridge for providing a pulsating DC voltage from an AC voltage source 21 such as AC mains, and a chopper 30 providing a step-up DC voltage from the pulsating DC voltage. The chopper 30 includes an inductor 31, a MOSFET 32, and a smoothing capacitor 34. MOSFET 32 is connected in series with the inductor 31 across the rectifier 22 and is driven by a controller 40 to alternately turn on and off for providing a periodically interrupted voltage which is applied through a blocking diode 33 across the smoothing capacitor 34 to provide a resulting smoothed DC voltage to a load 23. A capacitor 38 of a relatively small capacitance is connected across the rectifier 22. The load 23 may comprises an inverter which provides a high frequency AC voltage from the output DC voltage of the power supply for driving a discharge lamp such as a fluorescent lamp.

Figure 1:
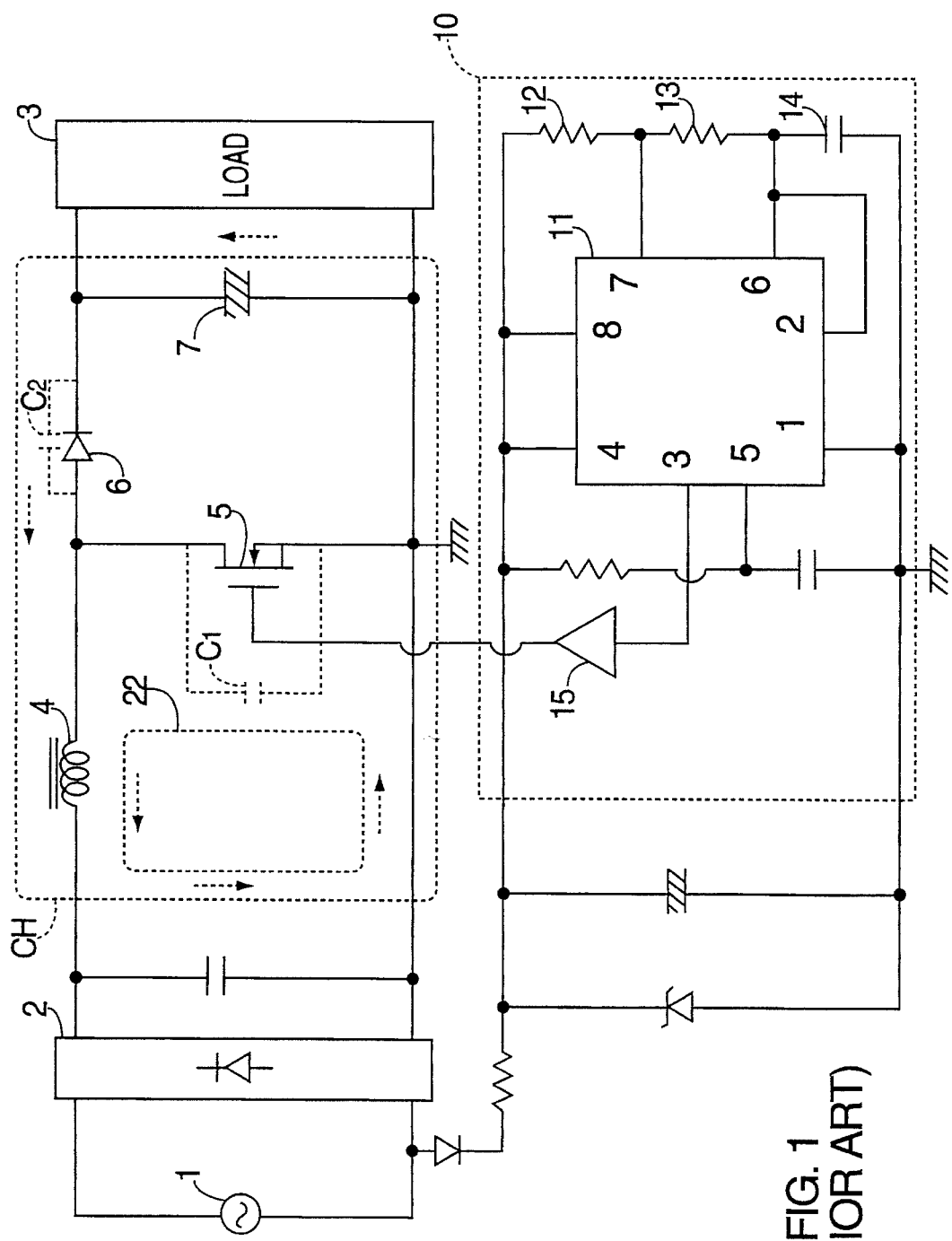
FIG. 1 is a circuit diagram of a prior art power supply.
Figure 2A:
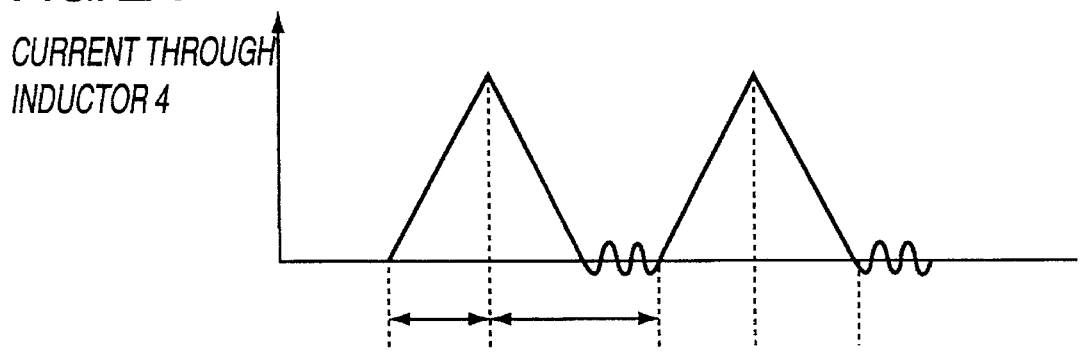
FIGS. 2A and 2B are waveform charts illustrating the operations of the power supply of FIG. 1.
Figure 2B:
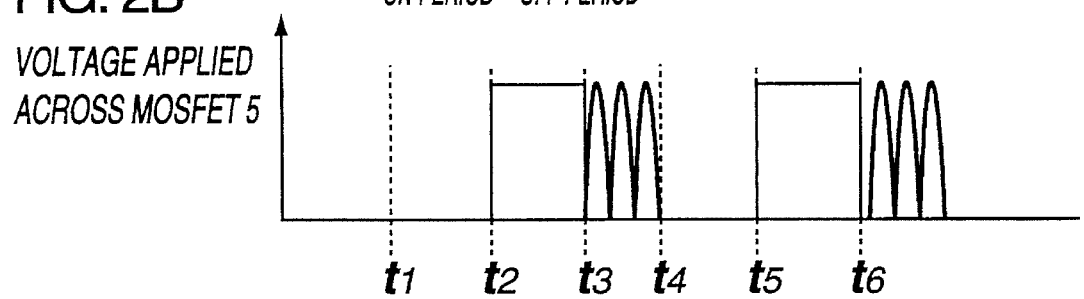
Figure 3A:
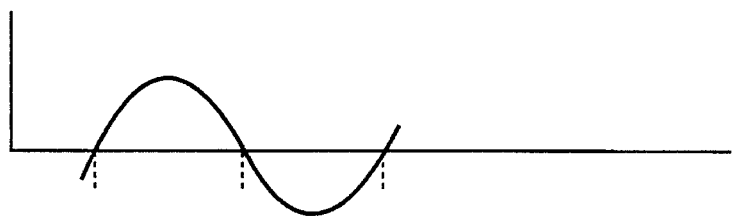
FIGS. 3A and 3B are waveforms illustrating waveforms of an input voltage and input current supplied from an AC voltage to a fullwave rectifier of the power supply of FIG. 1, respectively.
Figure 3B:
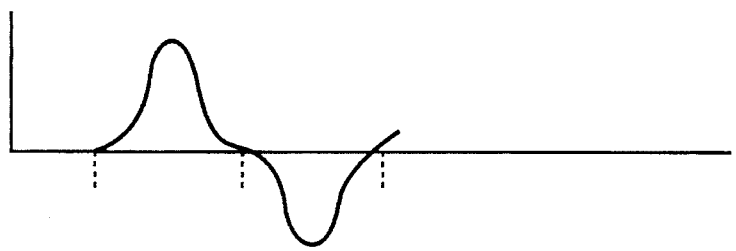
Figure 4A:
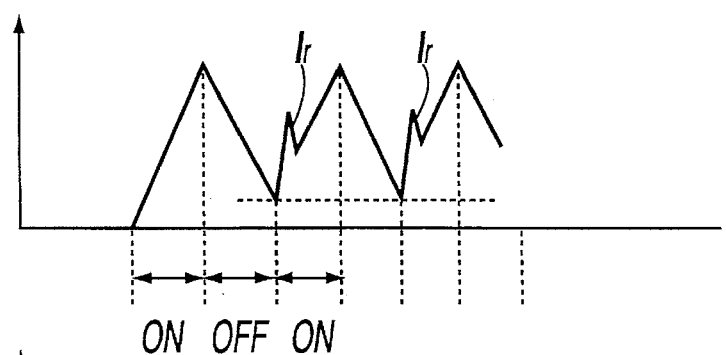
FIGS. 4A and 4B are waveform charts illustrating a problem expected in a modification of the power supply of FIG. 1.
Figure 4B:
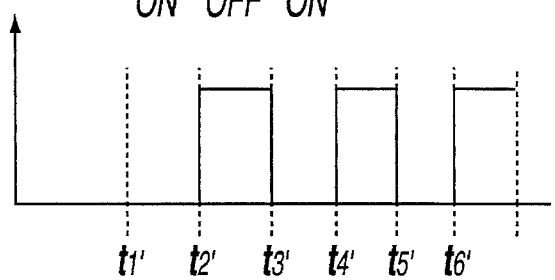
Figure 6:
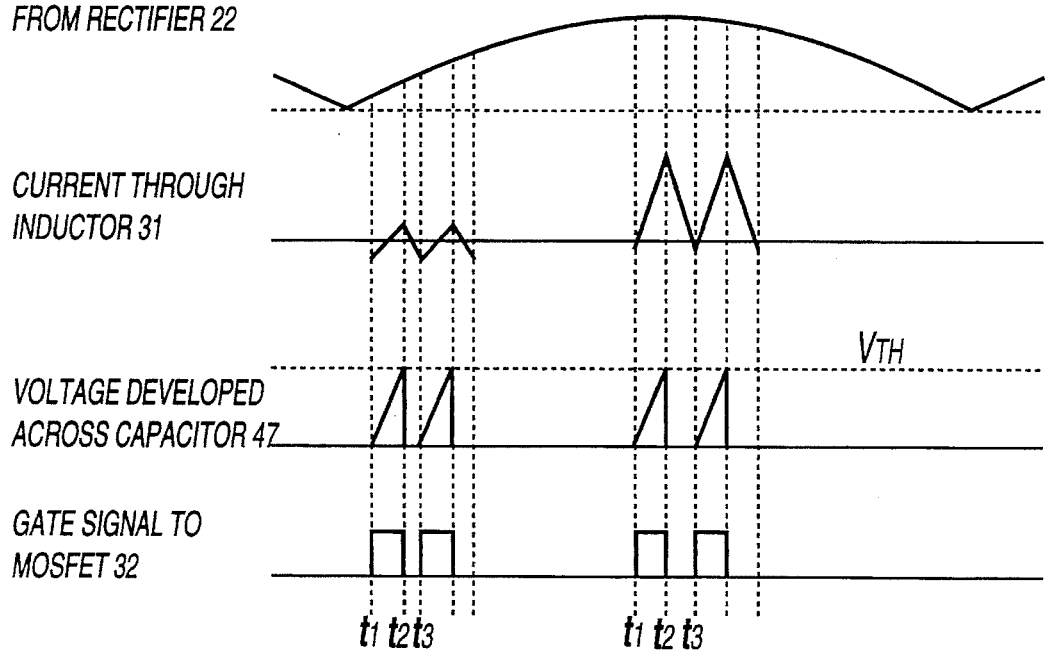
FIG. 6 is a waveform chart illustrating the operation of the power supply of FIG. 5.
Figure 5:
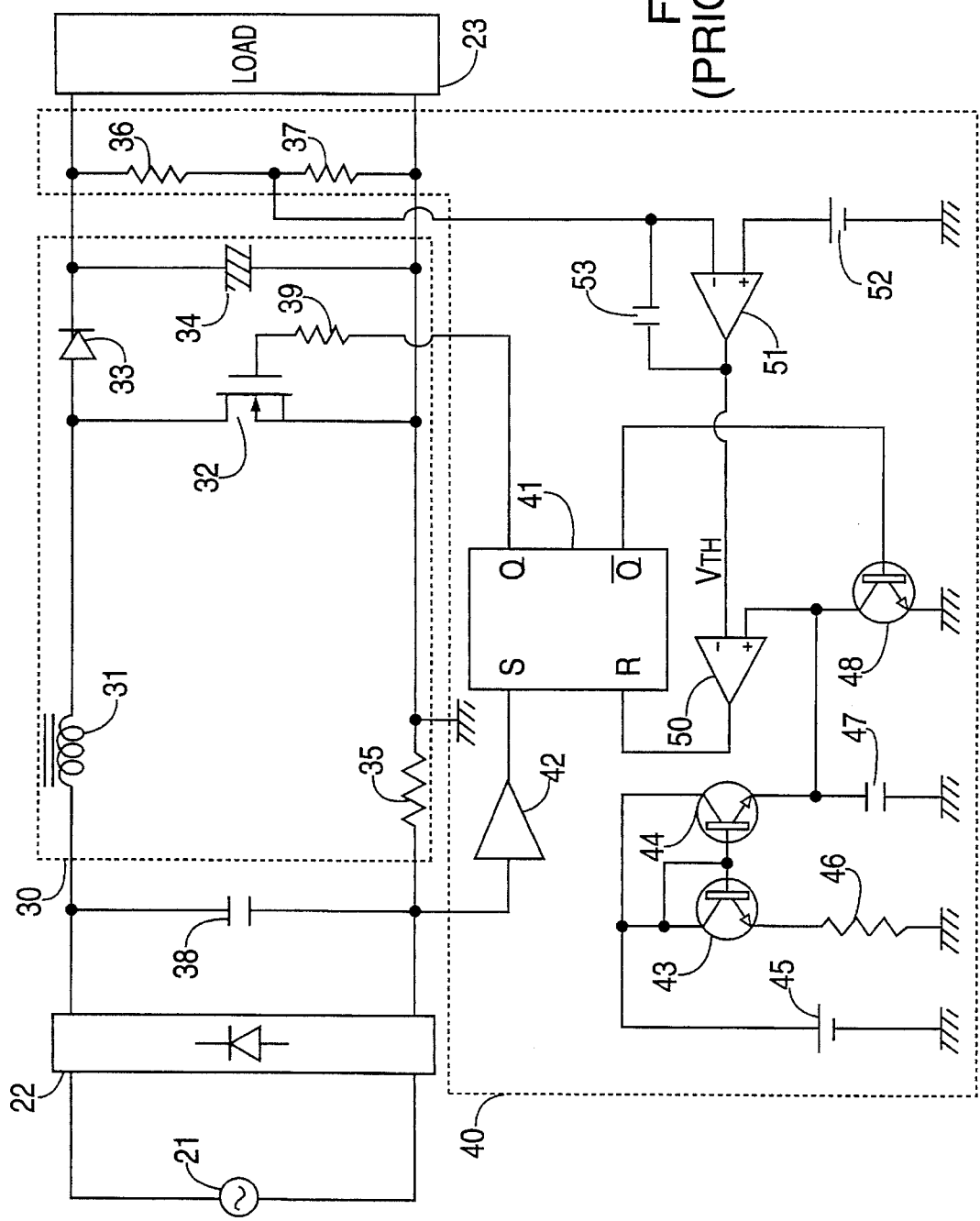
FIG. 5 is a circuit diagram of another prior art power supply.
Figure 7A:
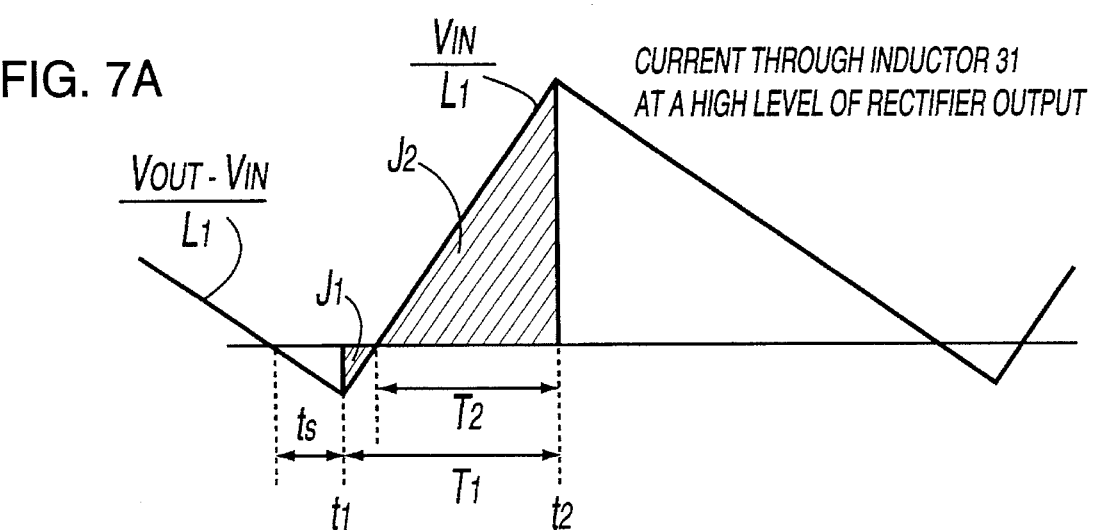
FIGS. 7A and 7B illustrate enlarged waveforms of a current flowing through an inductor of the power supply of FIG. 5, respectively when a pulsating DC voltage from a fullwave rectifier is high and low, respectively.
Figure 7B:
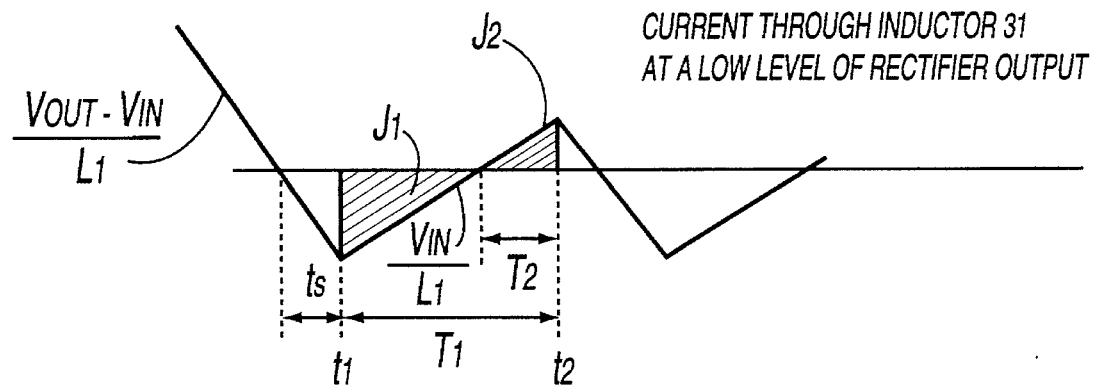
Figure 7C:
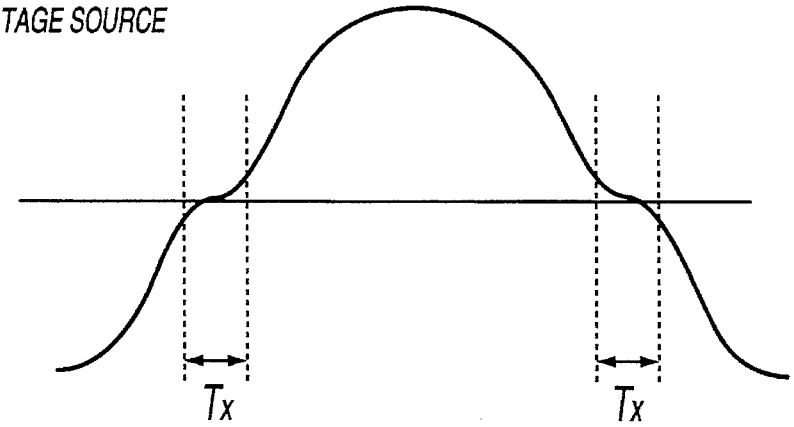
FIG. 7C illustrates a waveform of an input current supplied from an AC voltage source to the rectifier in the circuit of FIG. 5.
Figure 9:
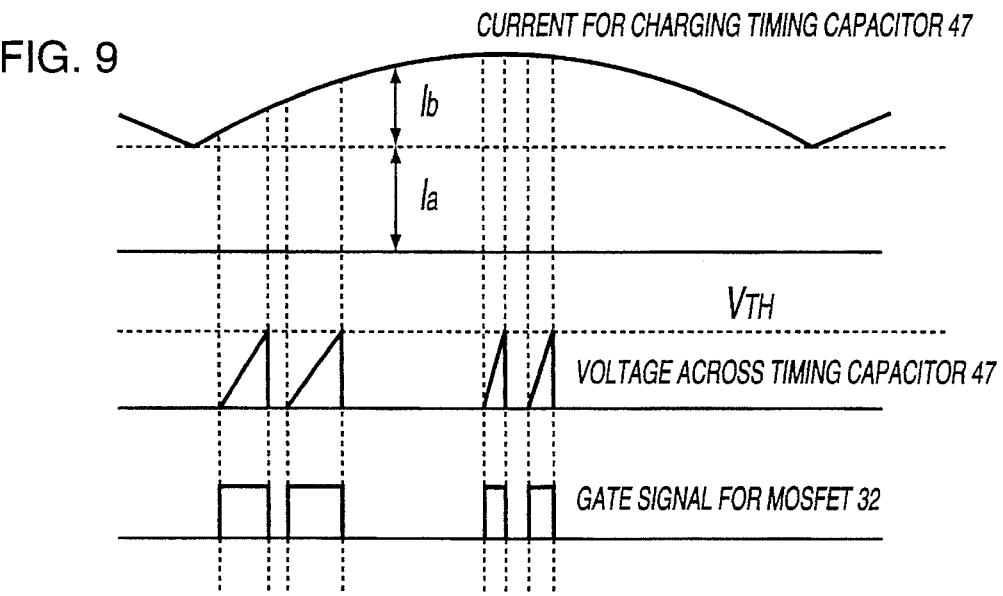
FIG. 9 is a waveform chart illustrating the operation of the power supply of FIG. 8.
Figure 10:
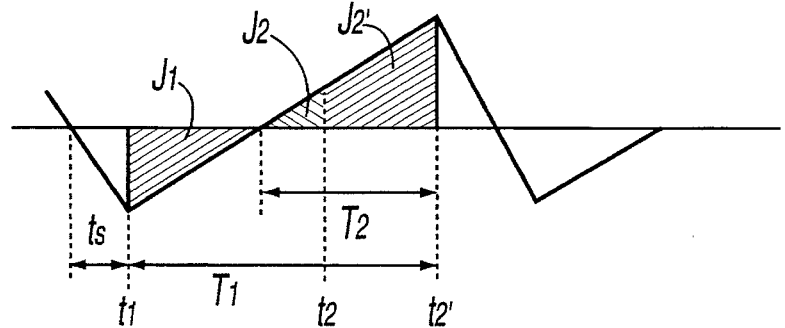
FIG. 10 illustrates an enlarged waveform of a current flowing through an inductor of the power supply of FIG. 8 when a pulsating DC voltage from the AC voltage source is low.

The controller 40 is basically identical to that shown in the prior power supply as explained hereinbefore with reference to FIG. 5, except that it further includes a current compensator which produces an extra current Ib varying in proportion to the pulsating DC voltage from the rectifier 22. The current compensator comprises a resistor 61 and a diode 61 which are connected in series with the timing capacitor 47 in order to give the extra current Ib in addition to the current Ia supplied from the DC supply 45 by the current mirror of the transistors 43 and 44 and resistor 46. Therefore, as the pulsating DC voltage from the rectifier 22 decreases, the extra current Ib reduces to thereby extend the duration in which the timing capacitor 47 is charged up to the threshold voltage VTH and therefore increase the ON-period of MOSFET 32, as shown in FIG. 9. With this consequence, as shown in FIG. 10, when the pulsating voltage is in the lower level, the ON-period T1 of MOSFET 32 is extended to terminate at time t4' rather than time t2 at which the MOSFET 32 would be otherwise turned off in the absence of the current compensator, thereby extending the effective duration T2 in which the current flows through the inductor 31 in the positive direction. As seen in the figures, the ON-period T1 starts at time t1 with the response delay ts from an instant when the current through the inductor 31 decreases to zero and MOSFET 32 is turned on when the current flows in the negative direction due to the oscillation for the reason as explained hereinbefore with reference to the prior art power supply. Accordingly, even when the pulsating DC voltage decreases to such a low level where the amount J1 of the current flowing continuously through the inductor 31 in the negative direction would be greater than the amount J2 of the current flowing continuously in the positive direction to distort the input current wave and lower the power factor, the current compensator can add the amount J2' of the current flowing in the positive direction to establish the relation J1<J2+J2', thereby conforming the input current waveform to the input voltage waveform for improved power factor. The other features of the present embodiment is identical to the prior power supply as discussed with reference to FIG. 5. Therefore, no duplicate explanation is made herein. However, it is confirmed that the threshold voltage VTH fed to the comparator 50 is kept at substantially constant level by a feedback control of providing a fixed voltage across the smoothing capacitor 34.

SECOND EMBODIMENT <FIGS. 11 AND 12>

Figure 12:
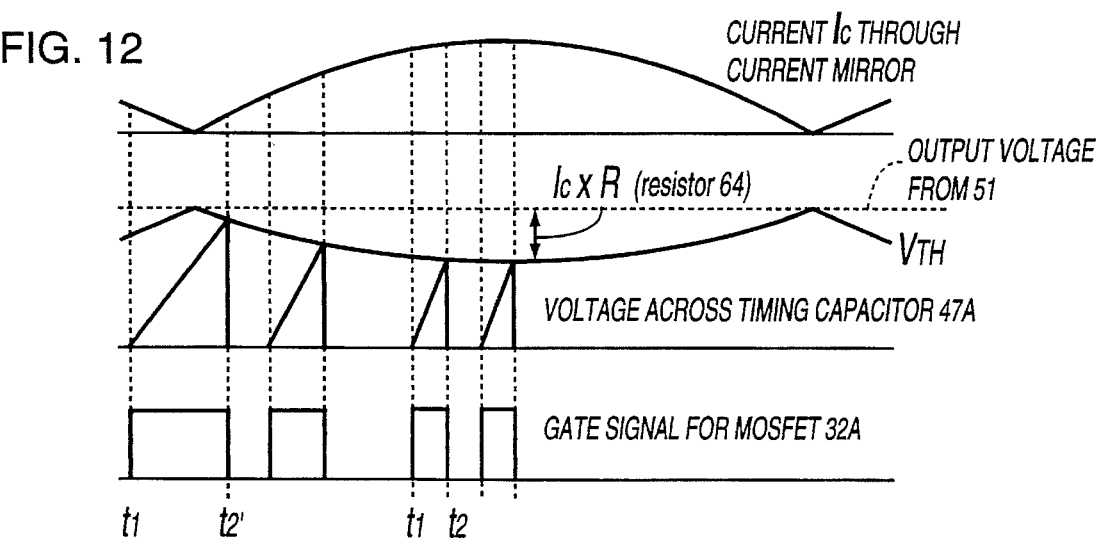
FIG. 12 is a waveform chart illustrating the operation of the power supply of FIG. 11.
Figure 11:
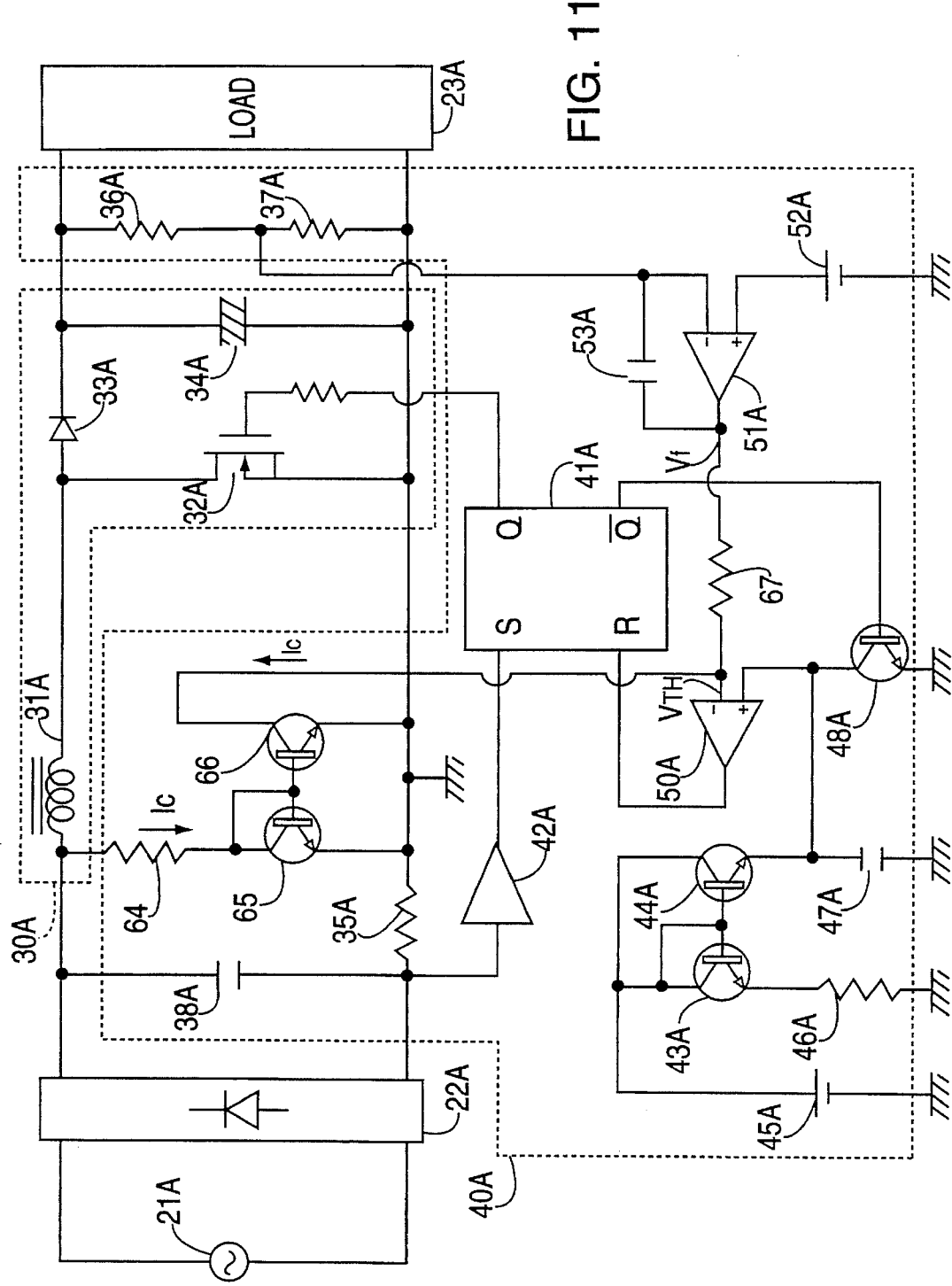
FIG. 11 is a circuit diagram of a power supply in accordance with a second embodiment of the present invention.

FIG. 11 illustrates a power supply in accordance with a second embodiment of the present invention which is similar to the first embodiment except that a controller 40A is configured to vary a threshold level VTH of the comparator 50A depending upon the pulsating DC voltage from the rectifier 22A in order to extend the ON-period of MOSFET 32A as the pulsating DC voltage decreases as is made in the first embodiment. Like elements are designated by like numerals with a suffix letter of "A". The controller 40A includes a current compensator in the form of a current mirror composed of a resistor 64, transistors 65 and 66 which flows a current Ic of a waveform coincident with the pulsating DC voltage from the rectifier 22A. The transistor 66 has its collector connected to the inverting input of the comparator 50A to which the fixed voltage Vf is also supplied from the differential amplifier 51A such that the comparator 50A has a threshold voltage VTH which decreases as the pulsating DC voltage increase, as shown in FIG. 12, in a relation that VTH=Vf−Ic×R (resistor 64). The timing capacitor 47A is charged by the fixed DC supply 45A through the current mirror of resistor 46A and transistors 43A and 44A at a fixed rate. Therefore, the comparator 50A issues the high level output to the reset input R of flip-flop 41A at a timing which comes later as the pulsating DC voltage decreases. In this manner, the ON-period T1 of MOSFET 32A extends when the pulsating DC voltage lowers so as to add the amount J2' of the current flowing in the positive direction for establishing the above relation J1<J2+J2' even in the low level range of the pulsating DC voltage, as is shown in FIG. 10.

THIRD EMBODIMENT <FIGS. 13 AND 14>

Figure 13:
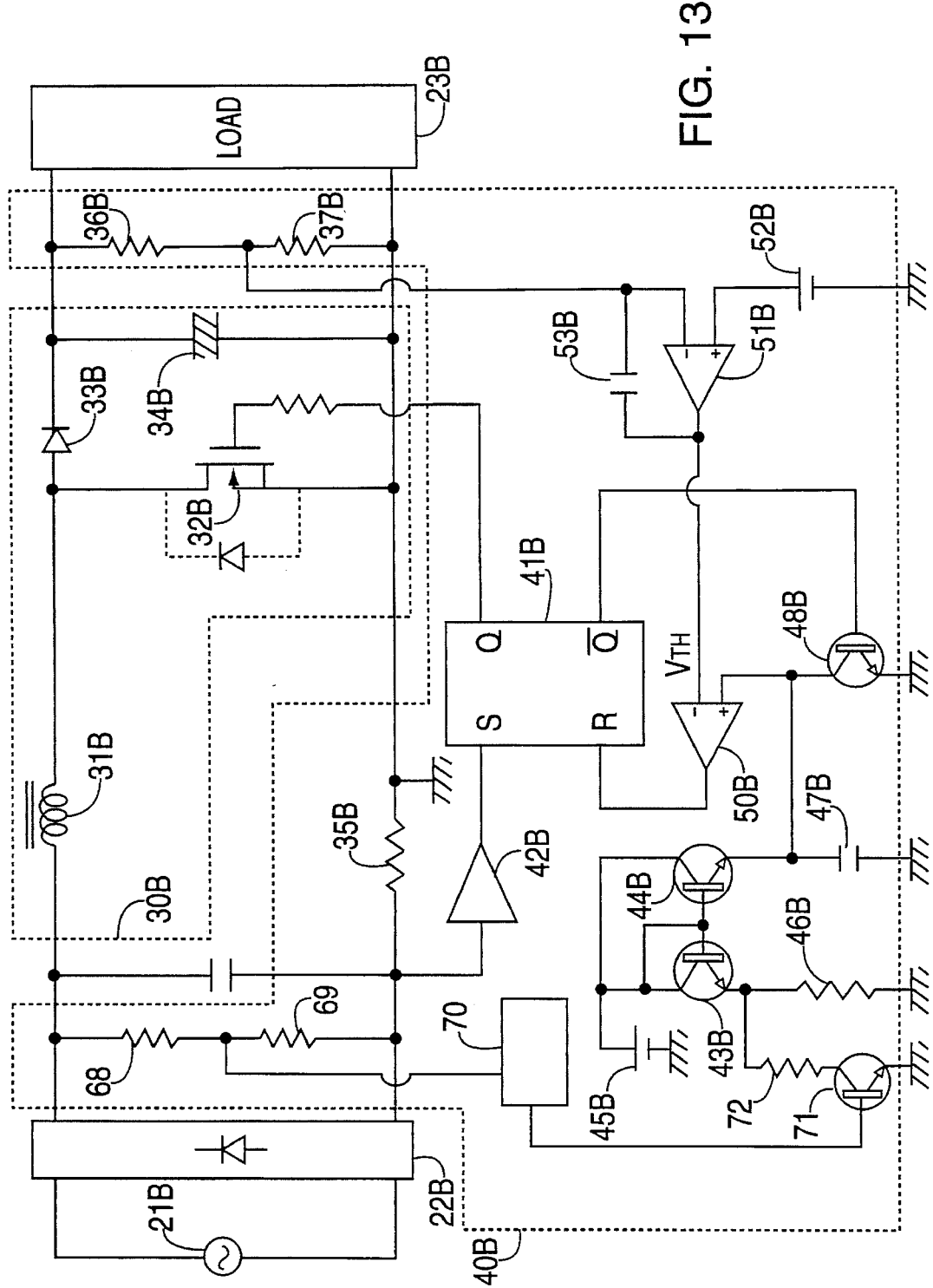
FIG. 13 is a circuit diagram of a power supply in accordance with a third embodiment of the present invention.
Figure 14:
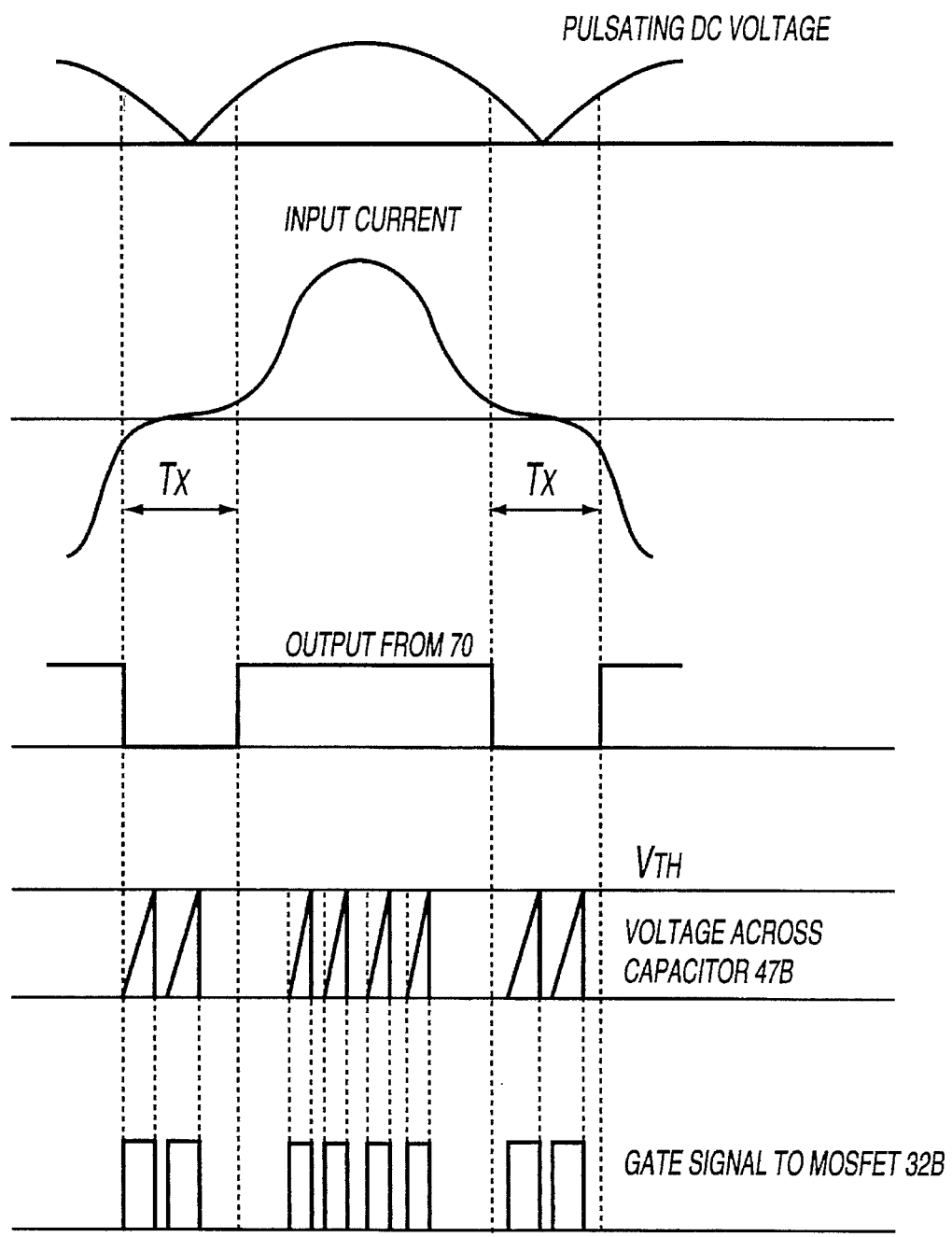
FIG. 14 is a waveform chart illustrating the operation of the power supply of FIG. 13.

FIG. 13 illustrates a power supply in accordance with a third embodiment of the present invention which is similar to the first embodiment except that a controller 40B is configured to vary the current flowing through the current mirror of transistors 43B and 44B and resistor 46B in accordance with the pulsating DC voltage from the rectifier 22B for extending the ON-period of MOSFET 32B when the pulsating DC voltage is low. Like elements are designated by like numerals with a suffix letter of "B" for easy reference purpose. A voltage divider of resistors 68 and 69 is connected across the rectifier 22B to provide a divided voltage of the pulsating DC voltage to a voltage detector 70 which has an internal reference voltage. When the divided voltage is detected to exceed the reference voltage, the detector 70 gives a bias to turn on a bipolar transistor 71. Transistor 71 is connected in series with a resistor 72 across the resistor 46B of the current mirror which flows a current from the fixed DC supply 45B to charge the capacitor 47B. Therefore, when transistor 71 is turned on to connect resistor 72 in parallel with resistor 46B, the parallel combination of resistors 71 and 46B acts to lower the resistance of the current mirror to thereby increase the current flowing into capacitor 47B. With this result, capacitor 47B is charged up to the threshold voltage VTH of the comparator 50B within a short time period when the detector 70 detects that the pulsating DC voltage increases to a critical level, as shown in FIG. 14. In other words, capacitor 47B is charged up to the threshold voltage VTH over an elongated time period to extend the ON-period of MOSFET 32B when the pulsating DC voltage is lower than the critical level. The critical level is selected such that the ON-period is extended to add the amount J2' of the current flowing in the positive direction for establishing the above explained relation J1<J2+J2' during a range Tx where J1≧J2 due to the lowered pulsating DC voltage. Therefore, it is established in the entire period of the pulsating DC voltage the J1<J2+J2' or J1<J2.

Figure 15:
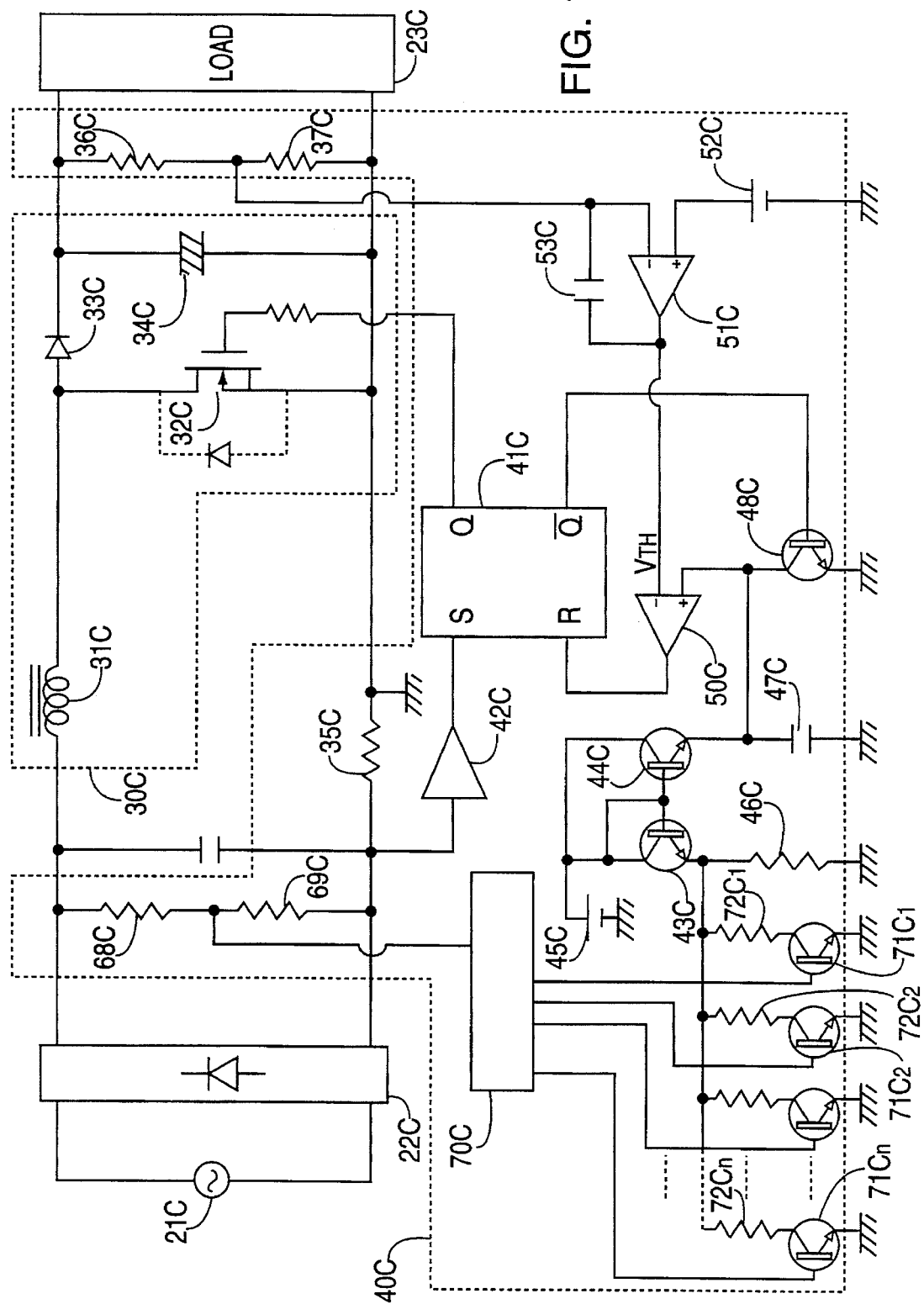
FIG. 15 is a circuit diagram of a modification of the third embodiment.

FIG. 15 illustrates a modification of the third embodiment which is identical to the third embodiment except that the voltage detector 70C has a plurality of reference voltages in order to vary in a stepwise manner the charging time of capacitor 47C, or ON-period of MOSFET 32C in accordance with the varying level of the pulsating DC voltage from the rectifier 22C. Like elements are designated by like numerals with a suffix letter of "C". A plurality of series combinations of transistors 71C1 to 71Cn and resistors 72C1 to 72Cn are connected in parallel with resistor 46C while transistors 71C1 to 71Cn are connected respectively at their bases to the detector 70C. Like voltage divider of resistors 68C and 69C is connected across the rectifier 22C to provide a divided voltage of the pulsating DC voltage to the detector 70C. The detector 70C turns on the transistor 71C1 to 71Cn cumulatively in sequence as the divided voltage increases from the lowest to highest reference voltages in order to add the number of resistors 72C1 to 72Cn combined in parallel relation to resistor 46C for increasing the current flowing through the current mirror as the pulsating DC voltage increases. Therefore, the charging rate of capacitor 47C decreases to extend the ON-period of MOSFET 32C in a stepwise manner as the pulsating DC voltage decreases to effect a more precise control in establishing the above relation J1<J2+J2' for an extended range of the pulsating DC voltage.

FOURTH EMBODIMENT <FIGS. 16 AND 17>

Figure 16:
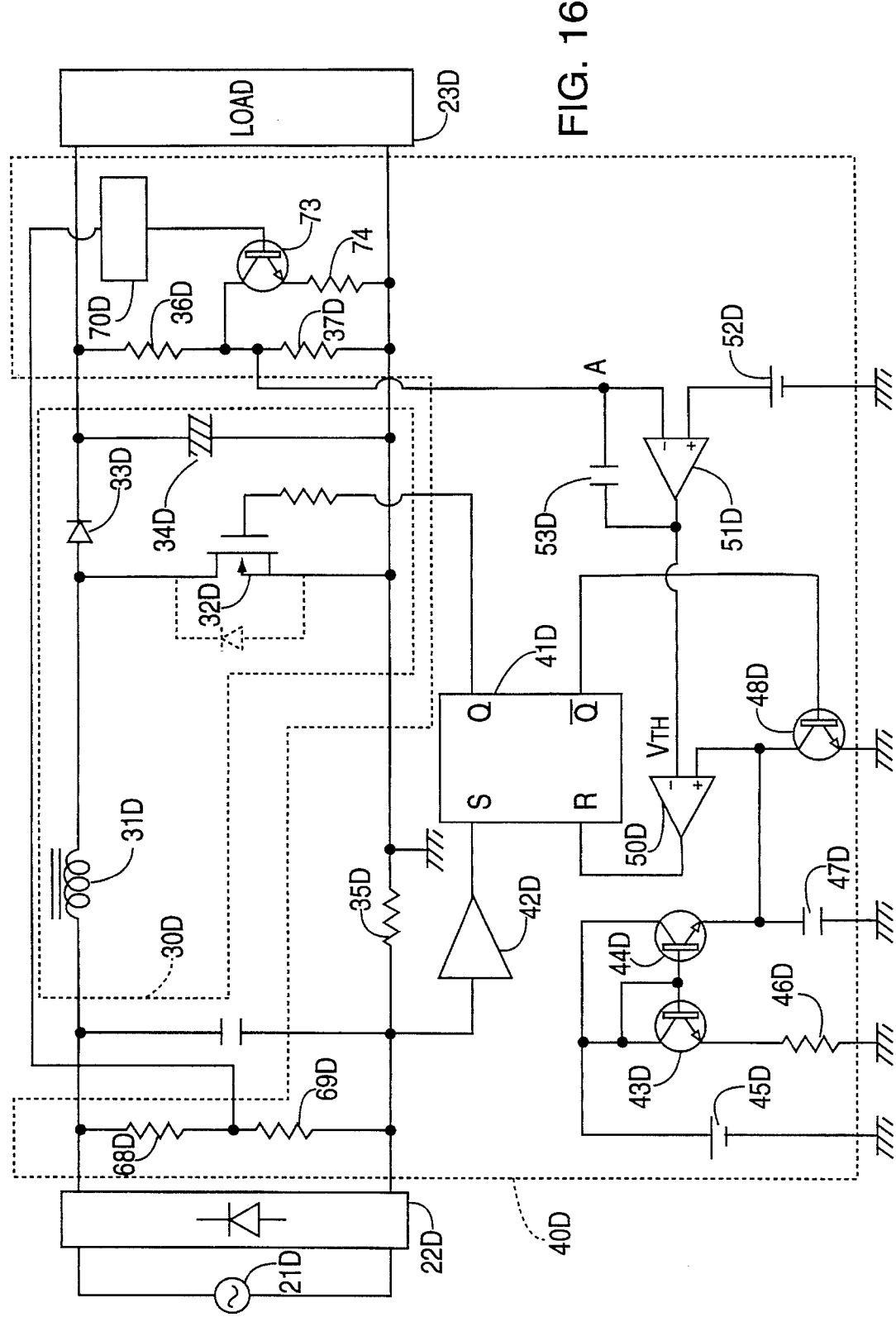
FIG. 16 is a circuit diagram of a power supply in accordance with a fourth embodiment of the present invention.
Figure 17:
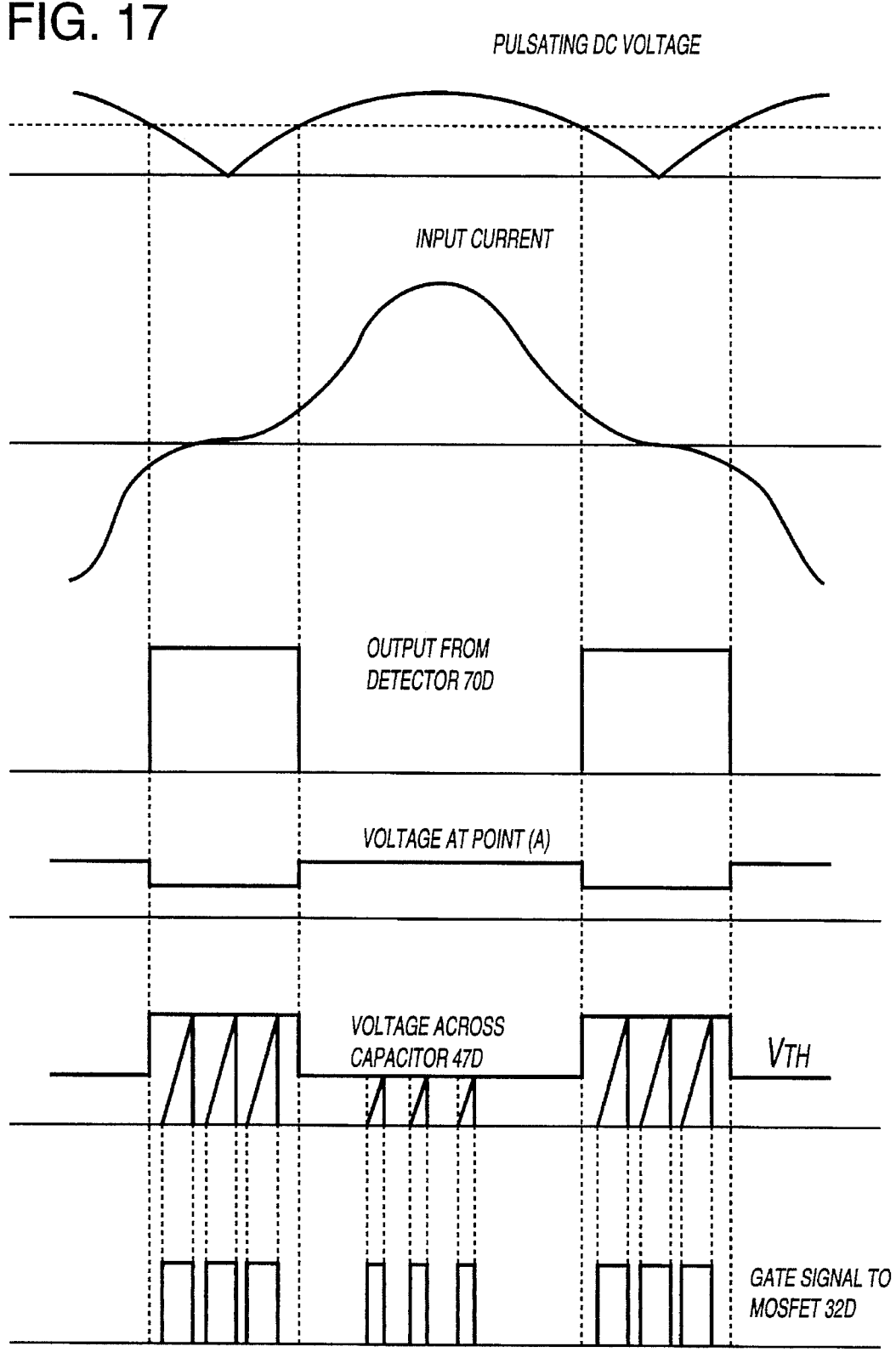
FIG. 17 is a waveform chart illustrating the operation of the power supply of FIG. 16.

FIG. 16 illustrates a power supply in accordance with a fourth embodiment of the present invention which is similar to the first embodiment except that a controller 40D is configured to vary the threshold voltage VTH of the comparator 50D in accordance with the pulsating DC voltage from the rectifier 22D, while capacitor 47D is charged at a constant rate from the DC supply 45D through like current mirror of transistors 43D and 44D and resistor 46D. Like elements are designated by like numerals with a suffix letter of "D". For this purpose, the controller 40D includes a voltage divider of resistors 68D and 69D connected across the rectifier 22D to provide a divided voltage indicative of the pulsating DC voltage from the rectifier 22D. The divided voltage is fed to a voltage detector 70D at which the divided voltage is compared with an internal reference voltage to issue a bias signal to a bipolar transistor 73 when the divided voltage exceeds the reference voltage or the pulsating DC voltage exceeds a critical voltage. Transistor 73 is connected in series with a resistor 74 across resistor 37D such that, when transistor 73 is turned on, resistor 74 is connected in parallel with resistor 37D to lower the voltage at point A in FIG. 16 fed to the inverting input of differential amplifier 51D, which in turn raises the output of the differential amplifier 51D, i.e., the threshold voltage VTH fed to the comparator 50D therefrom. In other words, when the pulsating voltage is lower than the critical level, detector 70D keeps transistor 73 turned on, thereby keeping the threshold voltage VTH at a higher level to have an extended ON-period of MOSFET 32D, as shown in FIG. 17. Thus, as is accomplished in the third embodiment, even during the low level range Tx of the pulsating DC voltage where J1≧J2 is expected, the controller 40D adds the amount J2' to thereby assure the relation J1<J2+J2' for improving the power factor.

Figure 18:
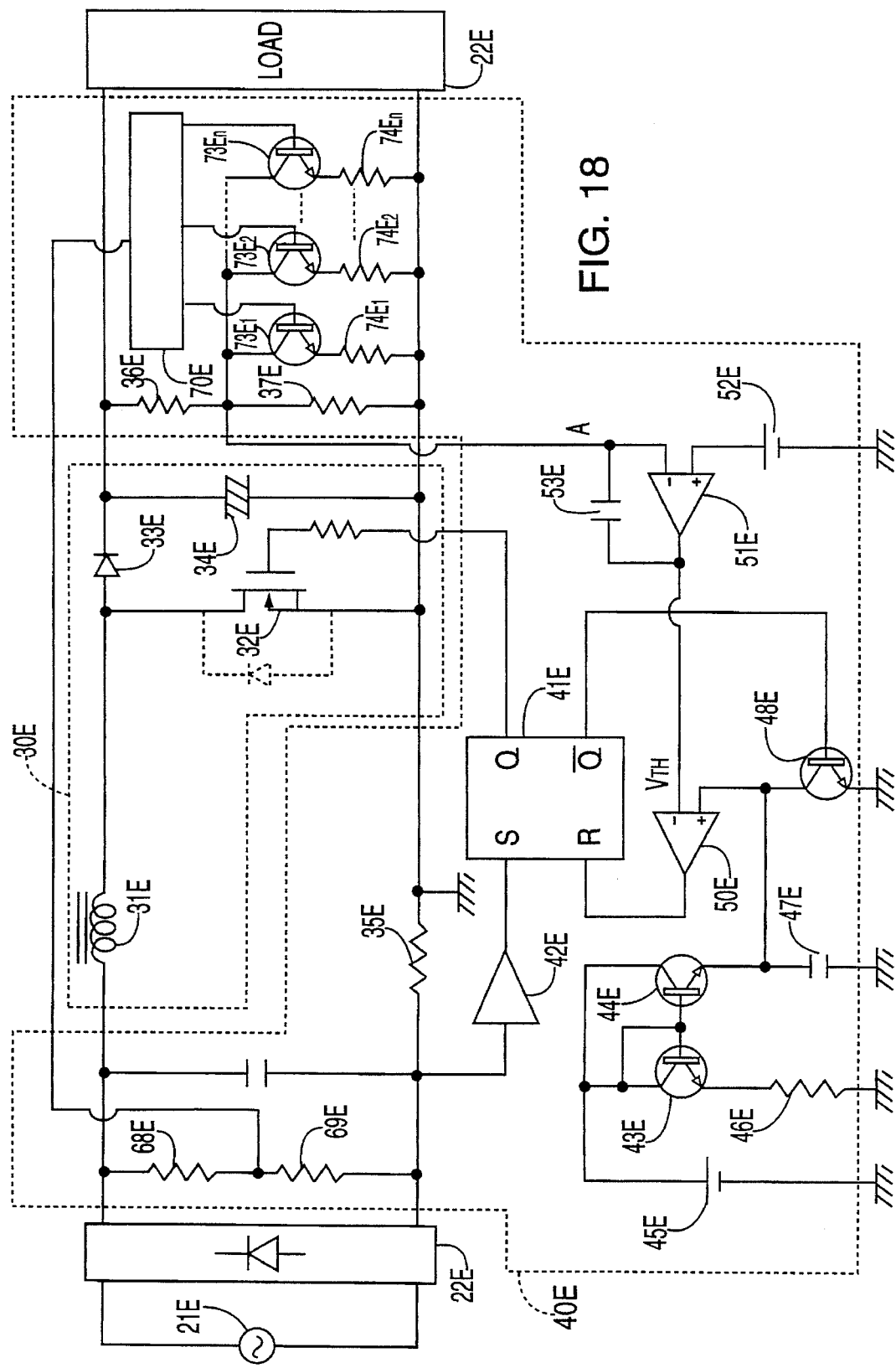
FIG. 18 is a circuit diagram of a modification of the fourth embodiment.

FIG. 18 illustrates a modification of the fourth embodiment which is identical to the fourth embodiment except that the voltage detector 70E has a plurality of reference voltages in order to vary in a stepwise manner the charging time of capacitor 47E, or ON-period of MOSFET 32E in accordance with the varying level of the pulsating DC voltage from the rectifier 22C by varying the threshold voltage VTH of the comparator 50E. Like elements are designated by like numerals with a suffix letter of "E". A plurality of series combinations of transistors 73E1 to 73En and resistors 74E1 to 74En are connected in parallel with resistor 37E while transistors 74E1 to 74En are connected respectively at their bases to the detector 70E. Like voltage divider of resistors 68E and 69E is connected across the rectifier 22E to provide a divided voltage of the pulsating DC voltage to the detector 70E. The detector 70E turns on the transistor 73E1 to 73En cumulatively in sequence as the divided voltage decreases from the highest to lowest reference voltages in order to add the number of resistors 74E1 to 74En combined in parallel relation to resistor 37E for lowering the voltage at point A in FIG. 18 fed to the inverting input of differential amplifier 51E as the pulsating DC voltage decreases. In other words, the capacitor 47E is charged up to the threshold level VTH for a time interval increasing in a stepwise manner to correspondingly extend the ON-period of MOSFET 32E as the pulsating DC voltage decreases to effect a more precise control in establishing the above relation J1<J2+J2' for an extended range of the pulsating DC voltage.

FIFTH EMBODIMENT <FIGS. 19 TO 21>

Figure 19:
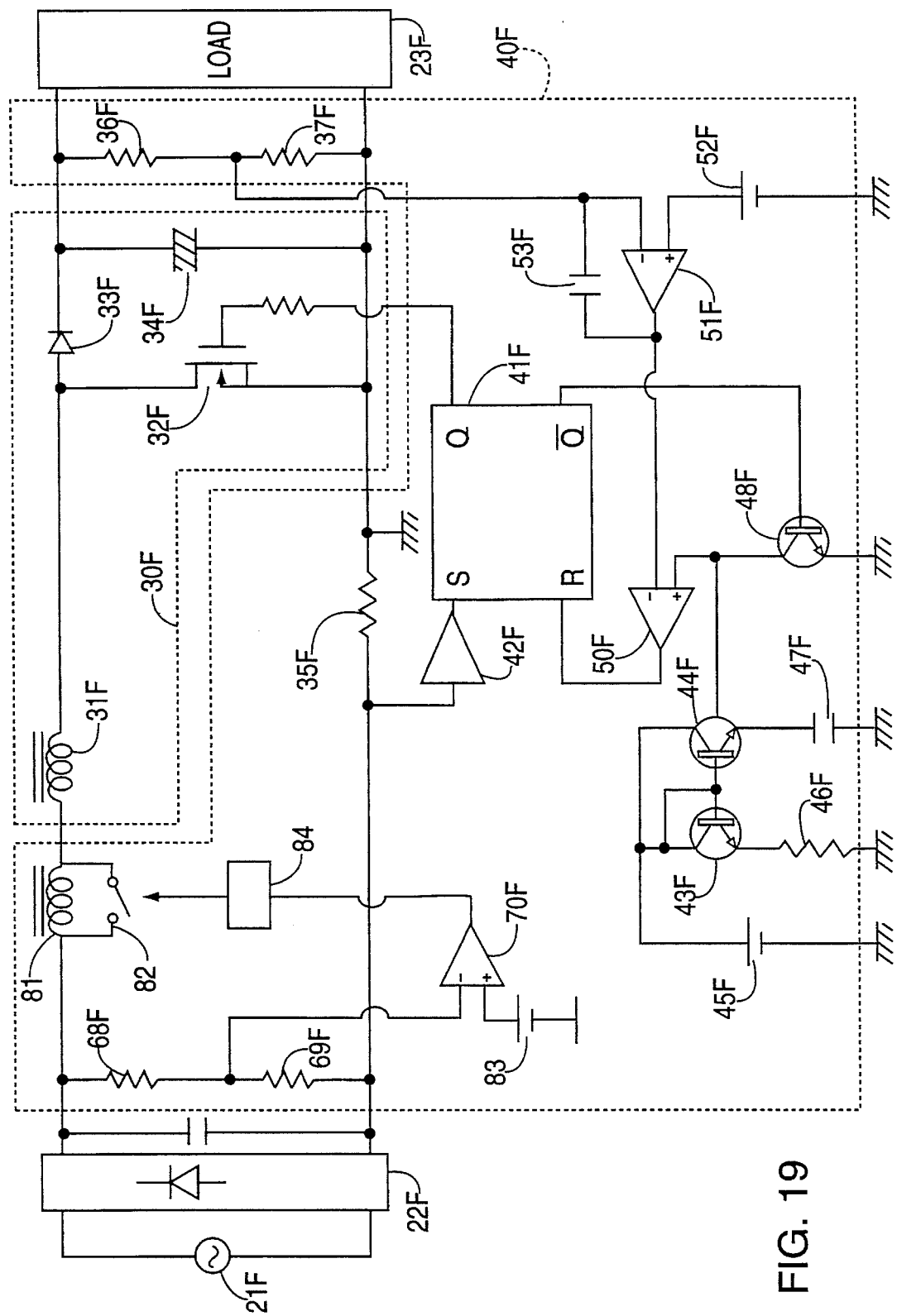
FIG. 19 is a circuit diagram in accordance with a fifth embodiment of the present invention.
Figure 20:
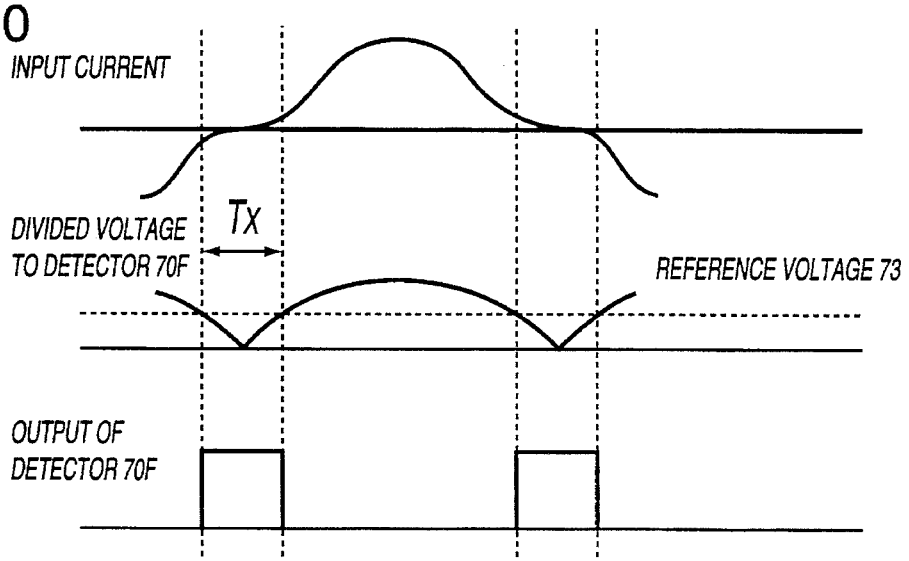
FIG. 20 is a waveform chart illustrating the operation of the power supply of FIG. 19.

FIG. 19 illustrates a power supply in accordance with a fifth embodiment of the present invention which is similar to the first embodiment except that a current compensator is included to vary the inductance of the chopper in such a manner as to increase the current flowing through the inductance in the positive direction when the pulsating DC voltage from the rectifier 22F is in the low level range. Like elements are designated by like numerals with a suffix letter of "F". In this embodiment, the flip-flop 41F controls to turn on and off MOSFET 32F with a constant ON-period as the timing capacitor 47F is charged by a fixed DC supply 45F for a constant time period up to the threshold voltage VTH kept at substantially constant level. The compensator comprises an additional inductor 81 connected in series with the first inductor 31F, a bypass switch 82 connected across the additional inductor 81, a voltage divider of resistors 68F and 69F connected across the rectifier 22F to provide a divided voltage indicative of the pulsating DC voltage, and a detector 70F comparing the divided voltage with a reference voltage from DC supply 83 to provide a trigger signal when the divided voltage is lower than the reference voltage as indicative of that the pulsating DC voltage is lower than a critical voltage. In the absence of the trigger signal or when the pulsating DC voltage is higher than the critical level, the additional inductor 81 is kept connected in series with the first inductor 31F to flow through the chopper circuit the current I of which gradient is expressed by the following relation dI/dt=VIN/(L1+L2) when storing the energy into the inductance and dI/dt=(VOUT−VIN)/(L1+L2) when releasing the energy from the inductance, wherein VIN is the input voltage to the chopper, VOUT is an output voltage of the chopper, L1 is an inductance of first inductor 31F, and L2 is an inductance of the additional inductor 81. On the other hand, when the trigger signal is issued to actuate the driver 84 to close the bypass switch 82 as a consequence of that the pulsating DC voltage is lower than the critical level within the range Tx as shown in FIG. 20, the additional inductor 81 is disconnected from the circuit to lower the inductance, as known from the relation that dI/dt=VIN/L1 when storing the energy into the inductance and dI/dt=(VOUT−VIN)/L1 when releasing the energy therefrom. Whereby it is made to increase the current flowing through the inductor 31F, as shown in FIG. 21, to establish the relation J1<J2 even in the low level range Tx of the pulsating DC voltage where J1≧J2 would be otherwise expected as indicated by dotted lines in FIG. 21.

Figure 21:
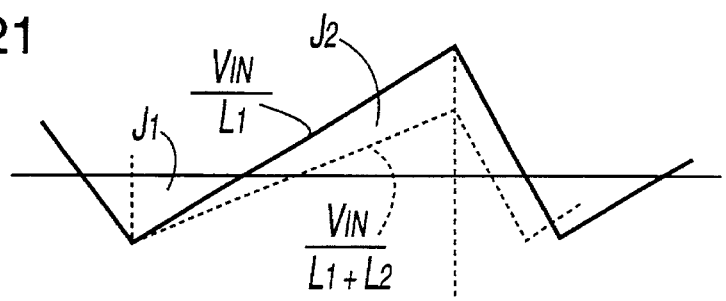
FIG. 21 illustrates an enlarged waveform of a current flowing through an inductor of the power supply of FIG. 19 when a pulsating DC voltage from the AC voltage source is low.
Figure 22:
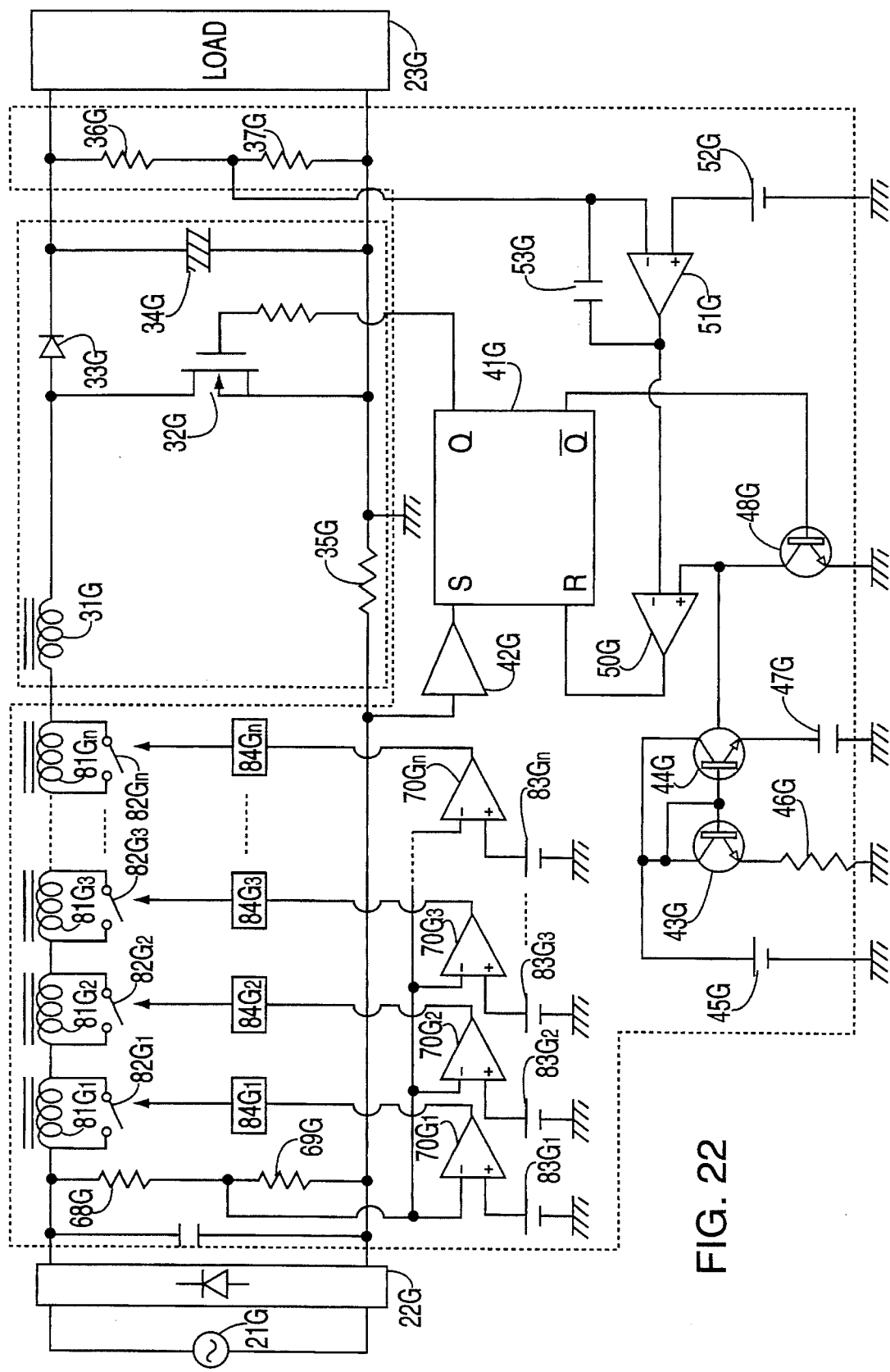
FIG. 22 is a circuit diagram of a modification of the fifth embodiment.

FIG. 22 illustrates a modification of the fifth embodiment which is identical to the fifth embodiment of FIG. 21 except that a plurality of additional inductors 81G1 to 81Gn are connected in series with the first inductor 31G with a corresponding number of bypass switches 82G1 to 82Gn connected across the respective ones of the additional inductors 81G1 to 81Gn. Also, a corresponding number of detectors 70G1 to 70Gn are provided to receive differing reference voltages from respective DC supplies 83G1 to 83Gn at their noninverting inputs. Like voltage divider of resistors 68G and 69G provides a divided voltage indicative of the pulsating DC voltage commonly to the inverting inputs of the detector 70G1 to 70Gn such that the detectors 70G1 to 70Gn respond to sequentially close the bypass switches 82G1 to 82Gn as the pulsating DC voltage from the rectifier 22G decreases, thereby lowering in a stepwise manner the inductance of the chopper for increasing the current flowing through the inductance of the chopper. With this result, a more precise control can be made over a wide range of the input DC voltage for establishing the above relation J1<J2 for still improved power factor free from harmonics in the input current from the AC voltage source 21C.

SIXTH EMBODIMENT <FIG. 23>

Figure 23:
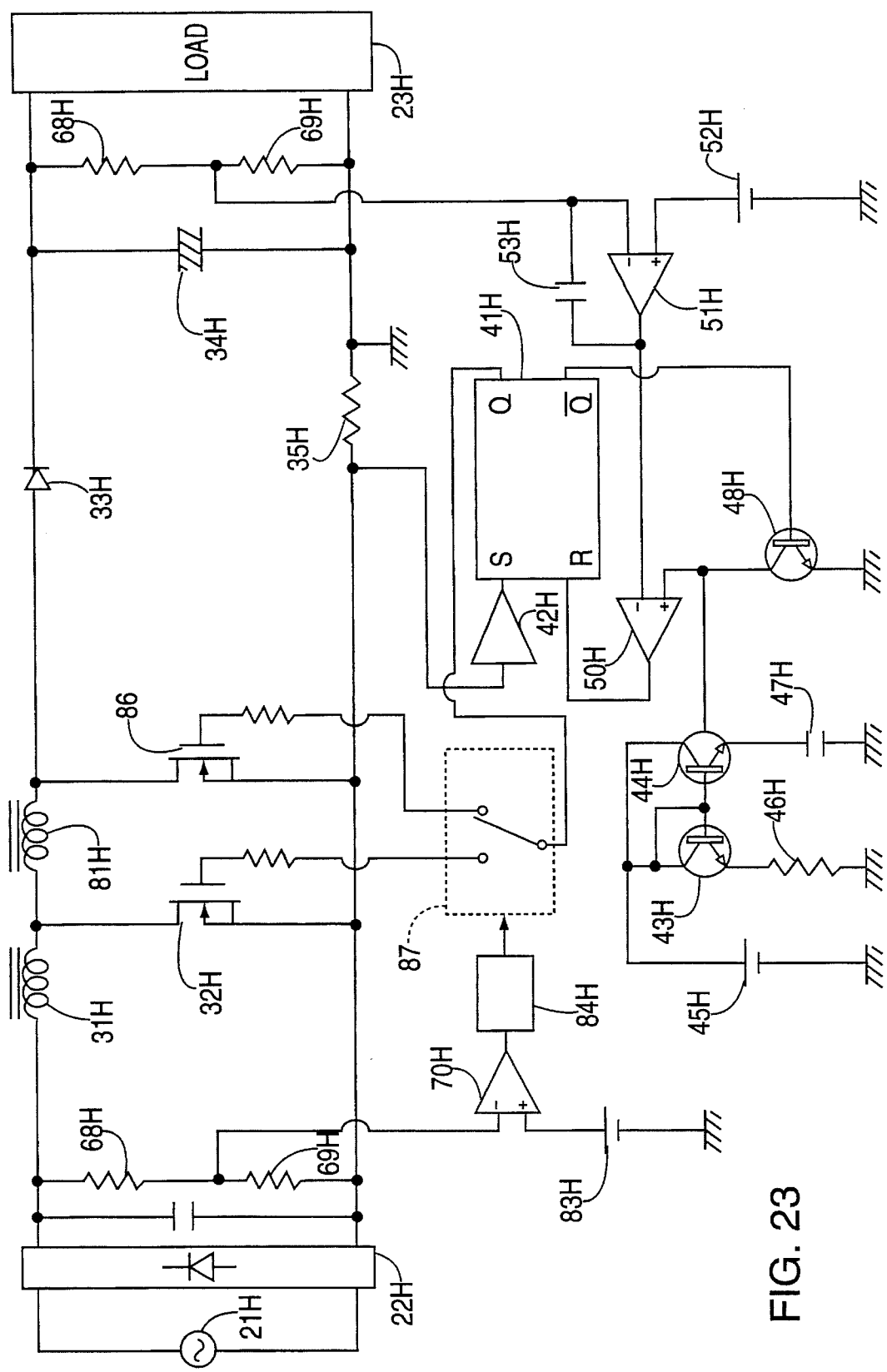
FIG. 23 is a circuit diagram of a power supply in accordance with a sixth embodiment of the present invention.

FIG. 23 illustrates a power supply in accordance with a sixth embodiment of the present invention which is similar to the fifth embodiment but disclose a current compensator of different configuration for varying the inductance of the chopper depending upon the pulsating DC voltage from the rectifier 22H. Like elements are designated by like numerals with a suffix letter of "H". In this embodiment, the flip-flop 41H controls to turn on and off MOSFET 32H with a constant ON-period as the timing capacitor 47K is charged by a fixed DC supply 45H for a constant time period up to the threshold voltage VTH kept at substantially constant level. The compensator comprises a series pair of additional inductor 81H and MOSFET 86 connected across the rectifier 22H in parallel with the pair of first inductor 31H and MOSFET 32H, voltage divider of resistors 68H and 69H providing a divided voltage indicative of the pulsating DC voltage, and a detector 70H which compares the divided voltage with a reference voltage from the DC supply 83H to give a trigger signal when the divided voltage decrease down to the reference voltage as indicative of that the pulsating DC voltage becomes lower than a predetermined voltage. The flip-flop 41H of the controller 40H has its output Q connected through a selector 87 to the gate of the first and additional MOSFETs 32H and 86H so as to selectively enable one of MOSFETs to turn on and off. In the absence of the trigger signal to the selector 87, the additional MOSFET 86 is enabled to turn on and off by the flip-flop 41H such that the first and additional inductors 31H and 81H are cooperative to store and release the energy while flowing the current of a corresponding level. On the other hand, when the trigger signal is issued in response to that the pulsating DC voltage becomes lower than the critical level, only the first MOSFET 31H is enabled to make the first inductor 31H alone active to store and release the energy, thereby increasing the current flowing through the inductor 31H. Therefore, also in this embodiment, it is possible to establish the above relation J1<J2 over the entire range of the pulsating DC voltage by suitable selecting the inductances for the inductors.

Figure 24:
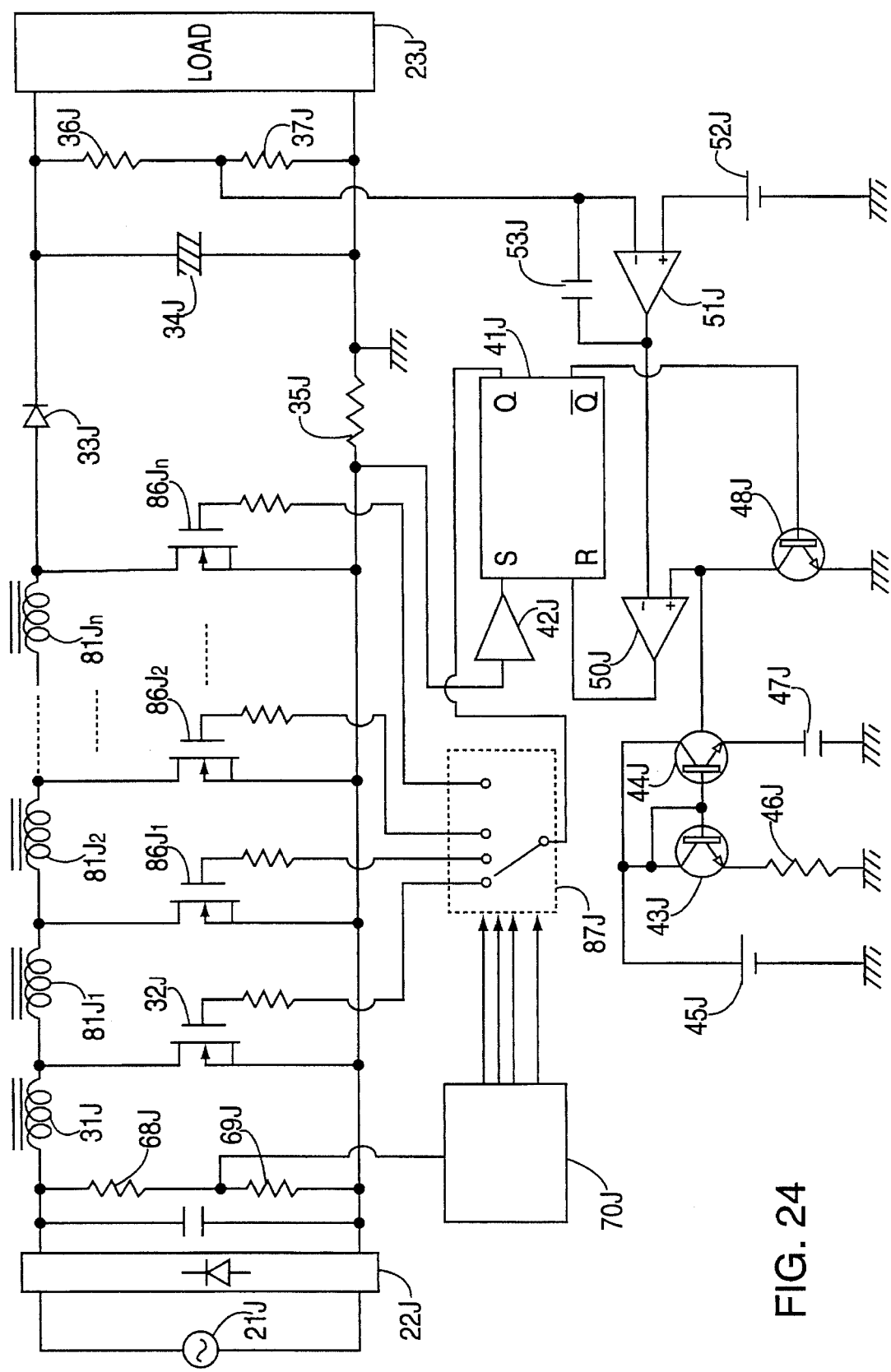
FIG. 24 is a circuit diagram of a modification of the sixth embodiment.

FIG. 24 illustrates a modification of the sixth embodiment which is identical to the sixth embodiment except that plural series combinations of additional inductors 81J1 to 81Jn and MOSFET 86J1 to 86Jn are included in circuit with each set being connected across the rectifier 22J in parallel relation to the series combination of first inductor 31J and MOSFET 32J. A selector 87J is interposed between the gates of first and additional MOSFETs and output Q of the flip-flop 41J to selectively enable one of MOSFETs to turn on and off in a controlled manner by the flip-flop 41J. Like voltage divider of resistors 68J and 69J is provided to give a divided voltage indicative of the pulsating DC voltage from the rectifier 22J. A detector 70J compares the divided voltage with a plurality of internal reference levels to provide trigger signals corresponding to the level of the divided voltage for selectively enable one of MOSFETs such that, as the pulsating DC voltage decrease, the number of the inductors responsible for storing and releasing the energy decreases, thereby increasing the current through the chopper in a stepwise manner.

Therefore, as is made in the circuit of FIG. 22, a more precise control can be made over a wide range of the input DC voltage for establishing the above relation J1<J2 for still improved power factor free from harmonics in the input current from the AC voltage source 21C.

SEVENTH EMBODIMENT <FIG. 25>

Figure 26:
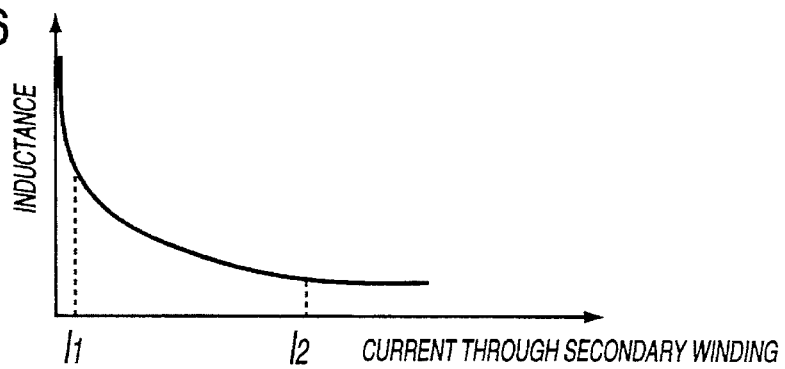
FIG. 26 is a graph illustrating inductance of an inductor in relation to a current flowing through a secondary winding coupled to the inductor in the circuit of FIG. 25.
Figure 25:
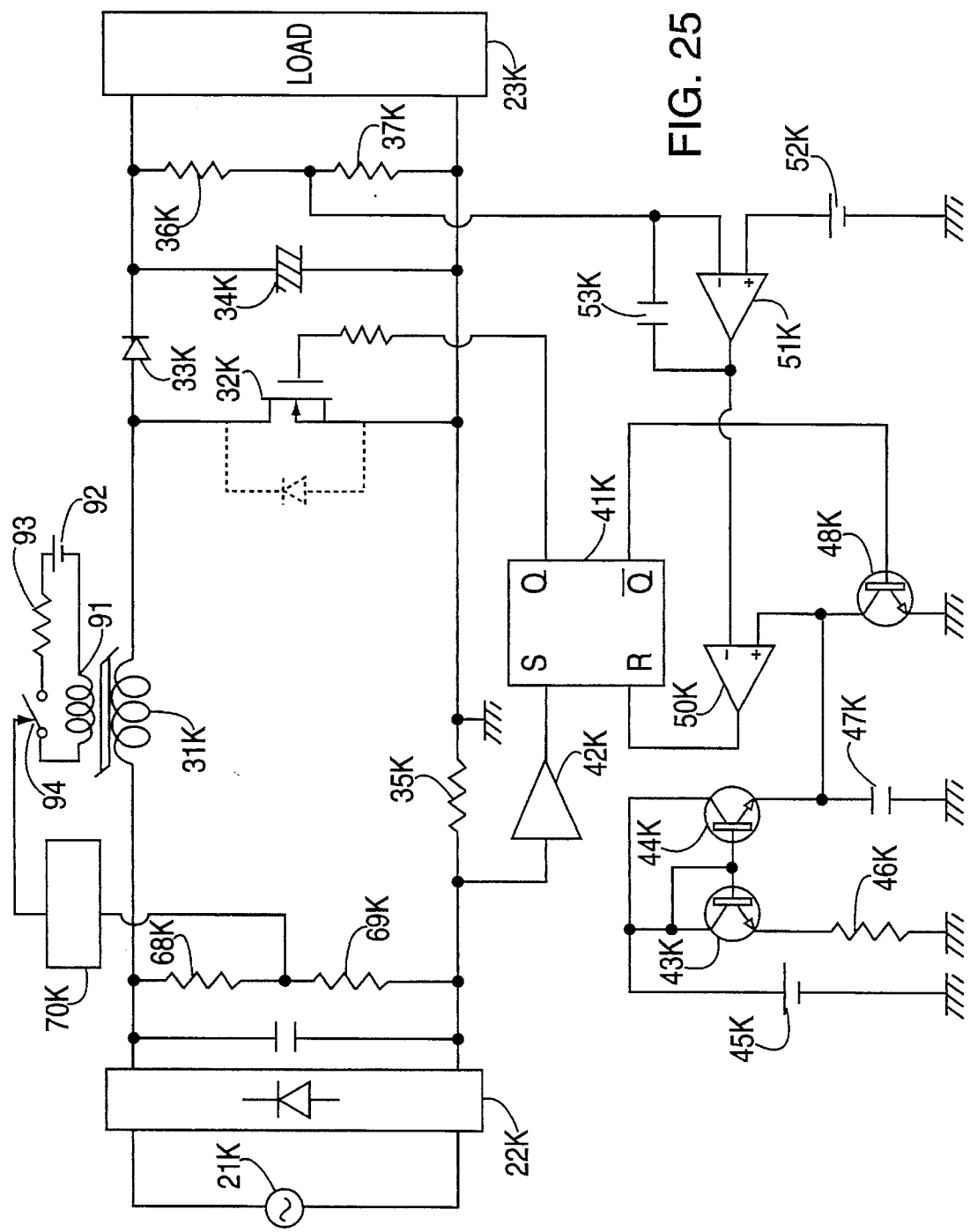
FIG. 25 is a circuit diagram of a power supply in accordance with a seventh embodiment of the present invention.

FIG. 25 illustrates a power supply in accordance with a seventh embodiment of the present invention which is similar to the first embodiment except that a current compensator is provided to vary the inductance of the inductor 31K or the current flowing therethrough depending upon the pulsating DC voltage from the rectifier 22K. Like elements are designated by like numerals with a suffix letter of "K". In this embodiment, the flip-flop 41K controls to turn on and off MOSFET 32K with a constant ON-period as the timing capacitor 47K is charged by a fixed DC supply 45K for a constant time period up to the threshold voltage VTH kept at substantially constant level. The inductor 31H utilized in the present embodiment is a saturable inductor which, as shown in FIG. 26, exhibits a characteristic of decreasing the inductance in a generally linear relation with an increase in a DC current flowing through a secondary winding 91 coupled thereto over a wide range from I1 to I2 of the DC current. The secondary winding 91 is connected to a fixed DC supply 92, a variable resistor 93, and a switch 94 to form a circuit loop which is opened and closed by the switch 94. A like voltage divider of resistors 68K and 69K provides a divided voltage indicative of the pulsating DC voltage to a detector 70K which responds to close the switch 94 when the pulsating DC voltage becomes lower than a critical level, thereby flowing the current through the secondary winding 91 to reduce the inductance of the inductor 31K, and therefore increasing the current flowing the inductor 31K. With this arrangement, it is also possible to increase the amount of the current flowing through the inductor 31K in a like manner as shown in FIG. 21, to establish the relation J1<J2 even in the low level range of the pulsating DC voltage where J1≧J2 would be otherwise expected as indicated by dotted lines in FIG. 21. Although not shown in FIG. 25, a more precise control may be made by utilizing one or more additional secondary windings which are selectively energized to vary the inductance of the inductor 31K depending upon the different levels of the pulsating DC voltage.

EIGHTH EMBODIMENT <FIGS. 27, 28A AND 28B>

Figure 28A:
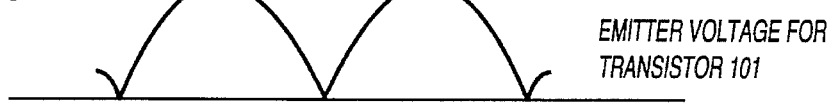
FIGS. 28A and 28B illustrate waveforms of an emitter voltage and a base current for a transistor 101 utilized in the circuit of FIG. 27.
Figure 28B:
Figure 27:
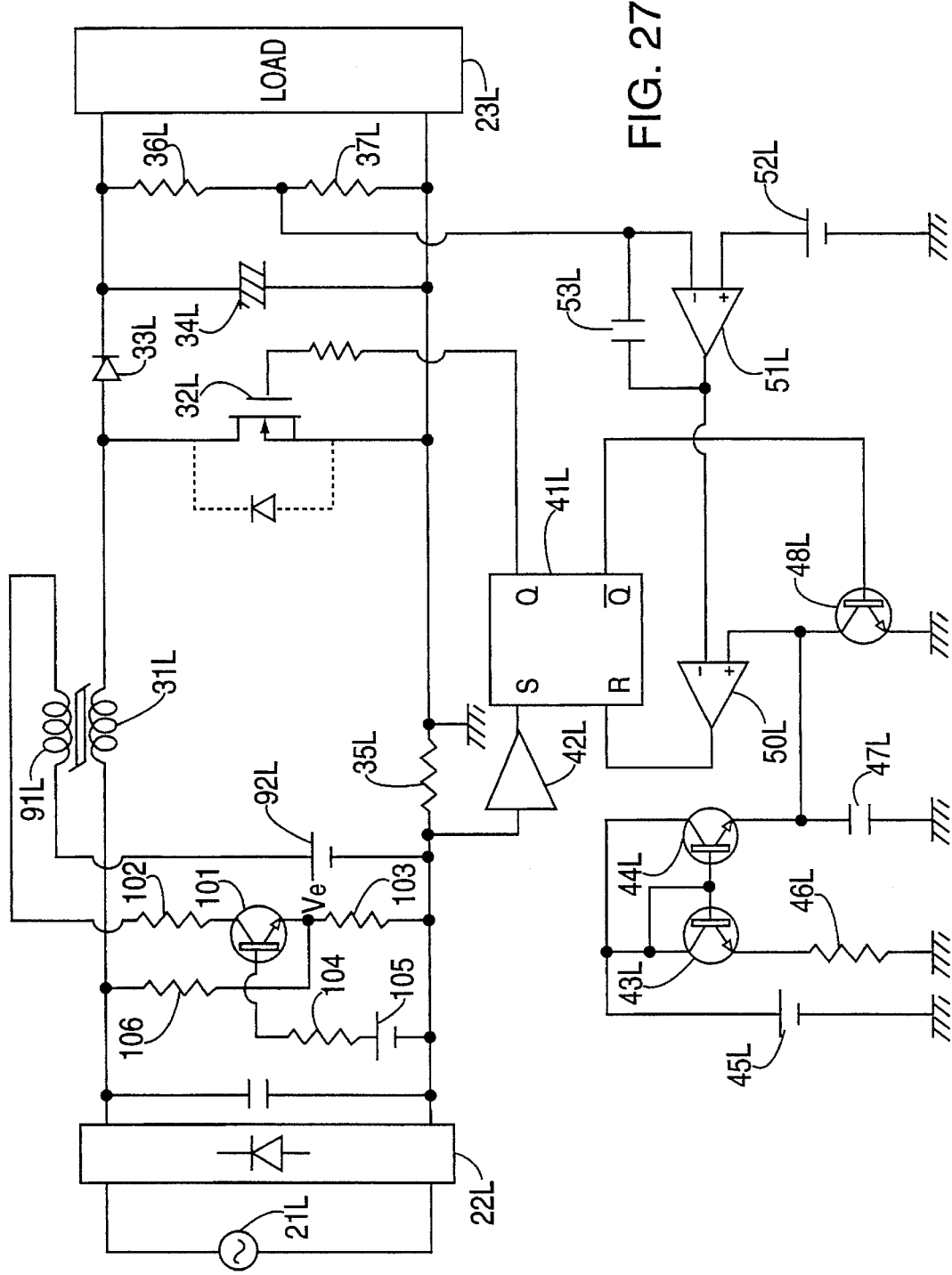
FIG. 27 is a circuit diagram of a power supply in accordance with an eighth embodiment of the present invention.

FIG. 27 illustrates a power supply in accordance with an eighth embodiment of the present invention which is similar to the seventh embodiment of FIG. 25 except that a current compensator operates to continuously vary the DC current flowing through the secondary winding 91L to continuously vary the inductance of the inductor 31L by utilizing the characteristic shown in FIG. 26. To this end, the secondary winding 91L is connected with a DC supply 92L and a bipolar transistor 101 to form a close loop with the collector of transistor 101 connected through a resistor 102 and secondary winding 91L to a positive terminal of the DC supply 92L and with the emitter of transistor 101 connected through a resistor 103 to the negative terminal of the DC supply 92L. The base of transistor 101 is connected through a resistor 104 to another DC supply 105 to receive a bias therefrom. The emitter of transistor 101 is connected through a resistor 106 to the rectifier 22L so as to have an emitter voltage Ve which is coincidence with the pulsating voltage, as shown in FIG. 28A, such that transistor 101 receives a base current which is the DC current minus the pulsating current, as shown in FIG. 28B. Whereby, transistor 101 controls to increase the current flowing through the secondary winding 91L as the pulsating DC voltage increases, which in turn decreases the inductance of the inductor 31L and therefore increases the current flowing through the inductor 31L. With this consequence, a precise control can be made to establish the above relation J1<J2 during ON-period of MOSFET 32L consistently over the entire range of the pulsating DC voltage for improving the power factor.

NINTH EMBODIMENT <FIGS. 29, 30, 31A AND 31B>

Figure 29:
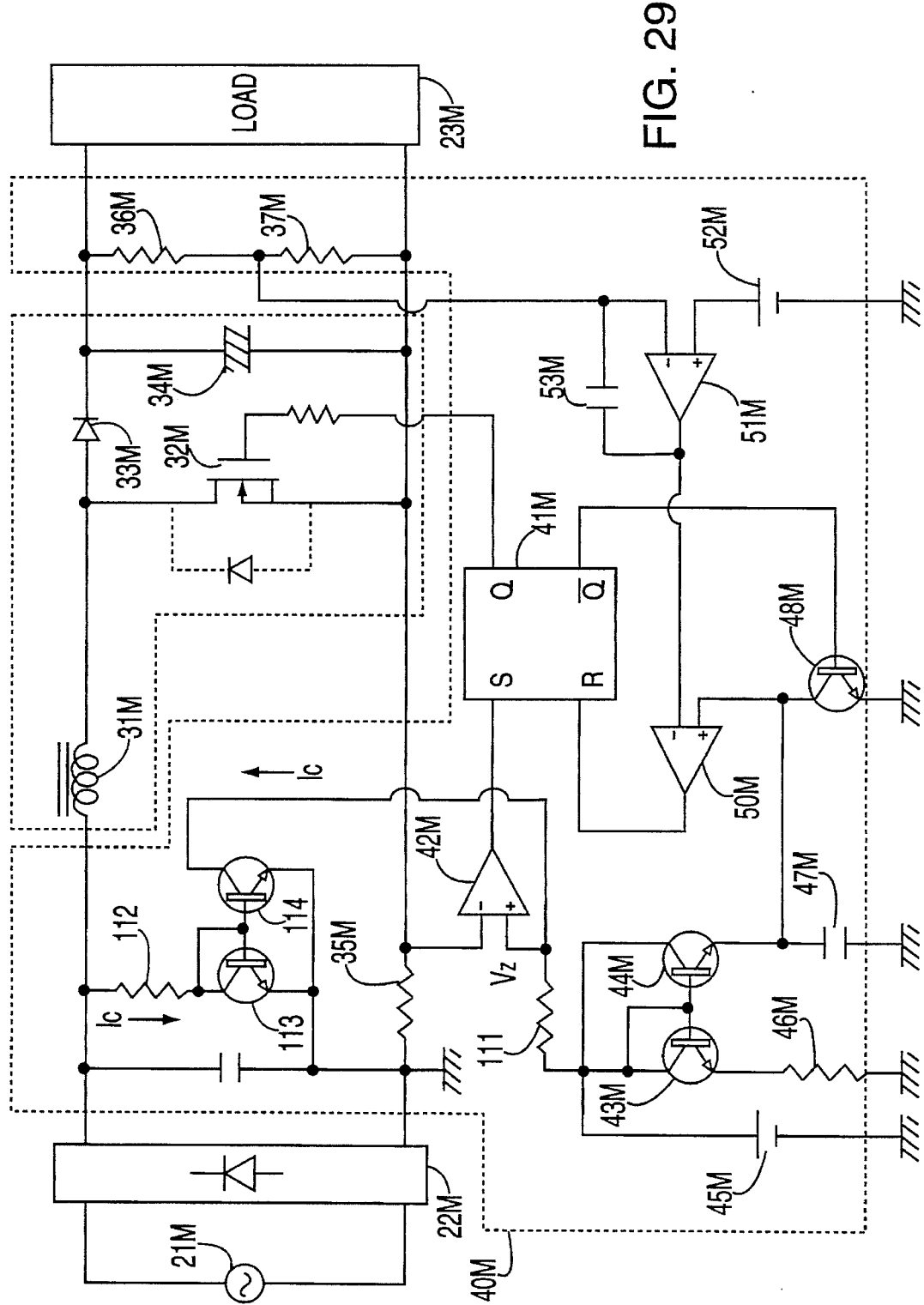
FIG. 29 is a circuit diagram of a power supply in accordance with a ninth embodiment of the present invention.

FIG. 29 illustrates a power supply in accordance with a ninth embodiment of the present invention which is similar to the first embodiment except that a controller 40M operates to vary a timing at which the flip-flop 41M turns on MOSFET 32M in response the decrease in the current flowing through the inductor 31M. Like elements are designated by like numerals with a suffix letter of "M". In this embodiment, the flip-flop 41M controls to turn on and off MOSFET 32M with a constant ON-period as the timing capacitor 47M is charged by a fixed DC supply 45M for a constant time period up to the threshold voltage VTH kept at substantially constant level. The controller 40M includes a current sensor 42M in the form of a comparator which receives at its inverting input a voltage developed across a current sensing resistor 35M as indicative of the current flowing through the inductor 31M. The comparator 42M is connected at its noninverting input to a fixed voltage from DC supply 45M through a resistor 111 and also to a current mirror composed of a resistor 112, transistors 113 and 114. The current mirror is connected in circuit to flow a current Ic of a waveform corresponding to the pulsating DC voltage from the rectifier 22M. The transistor 114 has its collector connected to the noninverting input of the comparator 42M to which a current is also supplied from the DC supply 45M, such that the comparator 42M has a threshold voltage Vz which increases as the pulsating DC voltage decrease, as shown in FIG. 30B. Therefore, when the pulsating DC voltage is higher than a certain level where the current releasing from the inductor 31M decreases at a rather low gradient, as shown in FIG. 31A, the comparator 42M has a lower threshold voltage Vz than that when the pulsating DC voltage is lower than the above level where the current releasing from the inductor 31M decreases at a high gradient, as shown in FIG. 31B. When the current is sensed to decrease down to the threshold voltage Vz, the comparator 42M responds to issue a start signal to set input S of the flip-flop 41M for turning on MOSFET 32M. In view of the response delay ts inherent to the circuit from an instant when the current decreases to the threshold voltage Vz and to an instant when MOSFET 32M is actually turned on, the threshold voltage Vz is selected such that, even at the bottom of the pulsating DC voltage, MOSFET 32M is turned on when the current flows in the negative direction after releasing the energy from the inductor substantially completely, as shown in FIG. 31B. Since the threshold voltage Vz lowers as pulsating DC voltage increases, it is assured that MOSFET 32M is turned on always at a timing t1 when the current flows in the negative direction over the entire range of the pulsating DC voltage. As apparent from FIG. 31B which illustrates a condition where the pulsating DC voltage is minimum, the threshold voltage Vz is raised to accelerate time t1 of turning on MOSFET 32M yet with a constant response delay ts, so that the amount of current flowing through the inductor 31M in the negative direction is reduced while increasing the amount of the current flowing in the positive direction within a constant ON-time period T1, thereby establishing the above relation J1<J2 even at the lowered pulsating DC voltage where the relation J1≧J2 would otherwise result, as shown in dotted lines in FIG. 31B, if MOSFET 32M be turned on at the same timing as when the pulsating DC voltage is at its peak as is seen in FIG. 31A.

TENTH EMBODIMENT <FIGS. 32, 33, 34A, AND 34B>

Figure 32:
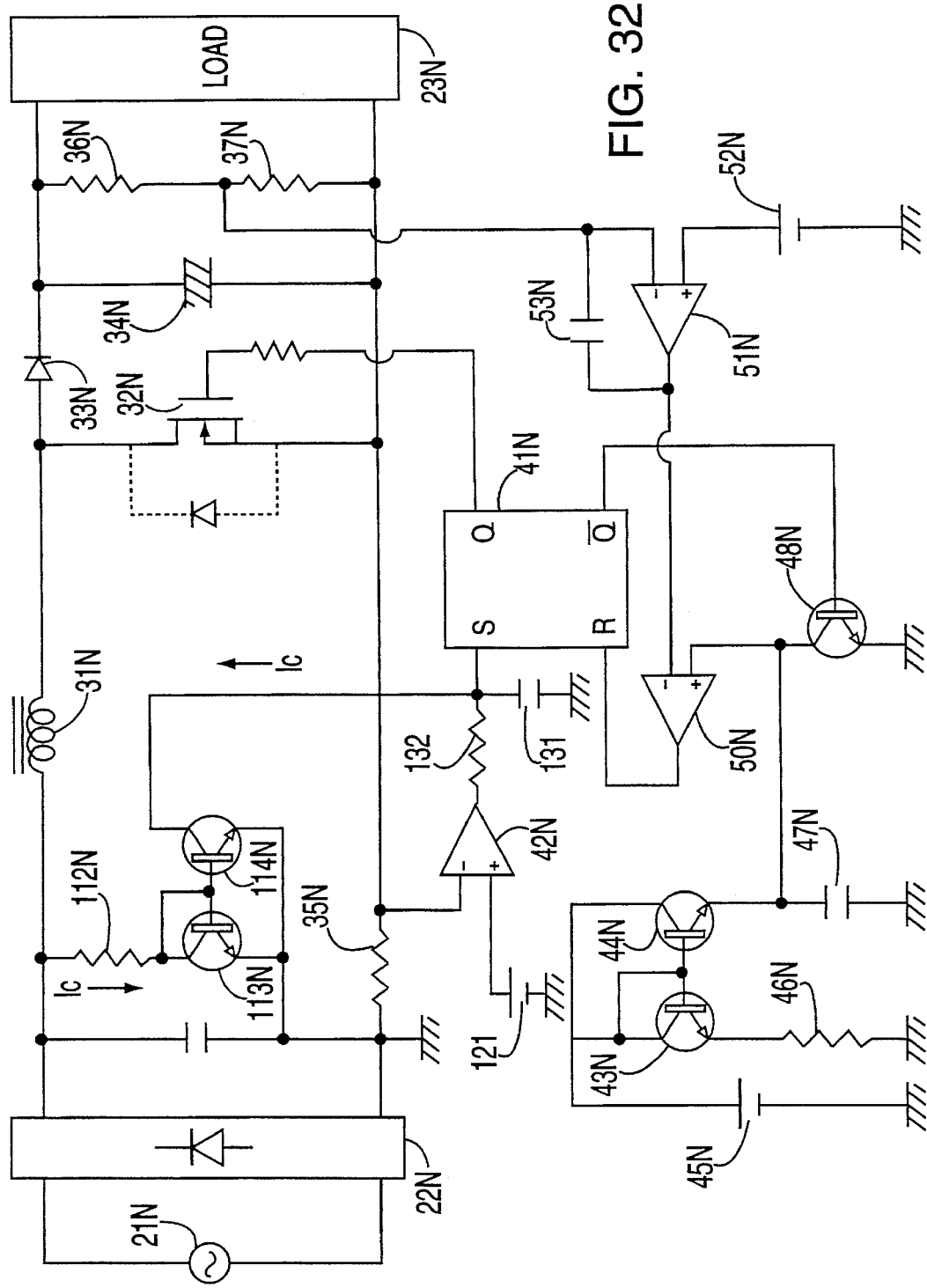
FIG. 32 is a circuit diagram of a power supply in accordance with a tenth embodiment of the present invention.
Figure 33:
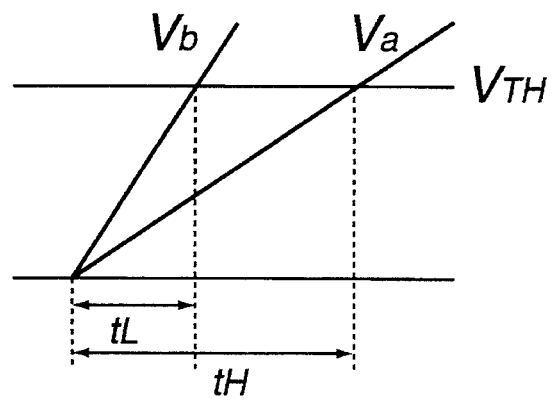
FIG. 33 is a graph illustrating a varying time interval from an instant when a current through an inductor decreases to zero and an instant when a switching element is actually turned on, in relation to the pulsating DC voltage from the rectifier for the circuit of FIG. 32.
Figure 34A:
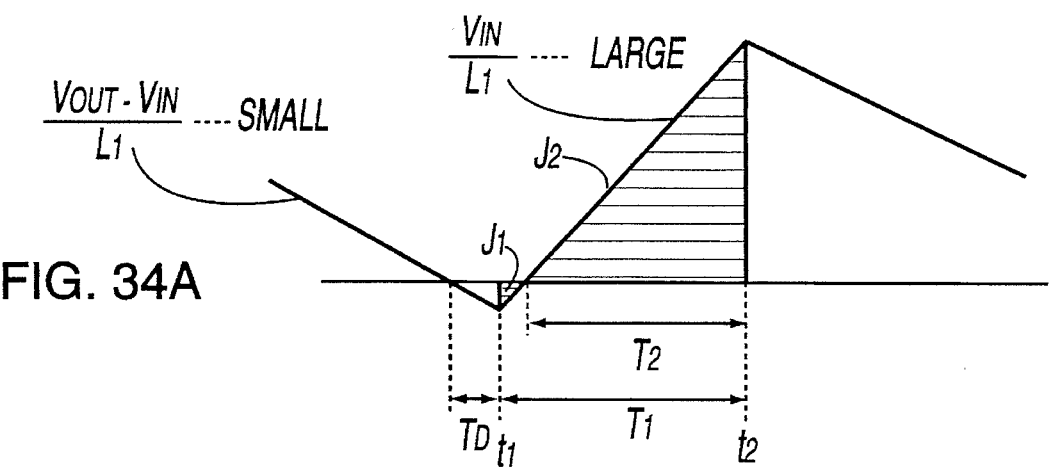
FIG. 34A and 34B illustrate enlarged waveforms of a current flowing through the inductor of the power supply of FIG. 32, respectively when the pulsating DC voltage from the rectifier is high and low, respectively.
Figure 34B:
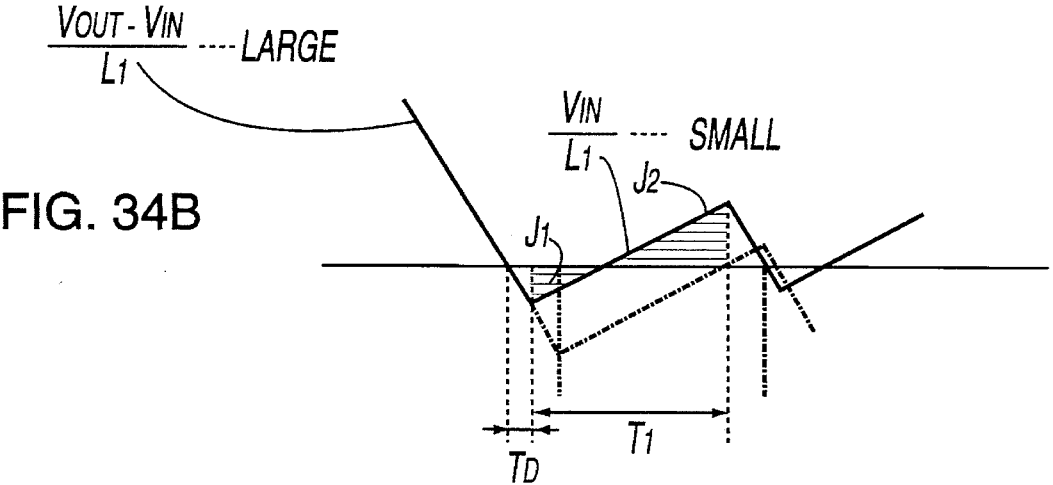

FIG. 32 illustrates a power supply in accordance with a tenth embodiment of the present invention which is similar to the ninth embodiment except that a timer is included to turn on MOSFET 32N a varying interval from an instant when a current sensor 42N detects the current flowing through the inductor 31N decreases to zero. Like elements are designated by like numerals with a suffix letter of "N". The current sensor 42N has a fixed reference voltage from DC supply 121 and produces a high level output when the voltage from current sensor 35N reduces to the reference voltage as indicative of that the current flowing through the inductor 31N reduces to zero. The timer comprises a capacitor 131 connected to be charged by the output of the sensor 42N through a resistor 132, and a like current mirror composed of resistor 112N, transistors 113N and 114N. The current mirror is connected in circuit to flow a current Ic of a waveform corresponding to the pulsating DC voltage from the rectifier 22N. The transistor 114N has its collector connected to the connection between capacitor 131 and resistor 132, so as to draw therefrom the current Ic to a less extent as the pulsating DC voltage decreases. Thus, as shown in FIG. 33, when the pulsating DC voltage is high, the flip-flop 41N receives an output Va which increases gradually to reach a threshold level of the set input S over a long interval tH, while the pulsating DC voltage is low, the output Vb increases rapidly to reach the threshold level of the set input S within a short interval tL. This means that the start signal is fed to the flip-flop 41N earlier to accelerate the turn on of MOSFET 32N as the pulsating DC voltage decreases. Therefore, as shown in FIGS. 34A and 34B, the response delay TD can be shortened when the pulsating DC voltage is at the low level range (FIG. 34B) than at the high level range (FIG. 34A) such that, even when the DC voltage is in the low level range, it can be made to minimize the amount J1 of the current flowing in the negative direction and increasing the amount J2 of the current flowing in the positive direction to establish the above relation J1<J2, as indicated by solid lines in FIG. 34B. Otherwise, or if MOSFET 32N be turned on with the same delay TD from an instant when the current flowing through the inductor 31N reduces to zero as in the condition where the pulsating DC voltage is in the high level range, the relation J1≧J2 would result, as indicated by dotted lines in FIG. 34B. In this manner, the relation J1<J2 is established over the entire range of the pulsating DC voltage for eliminating undesired harmonics in the input current to improve the power factor of the power supply.

Figure 35:
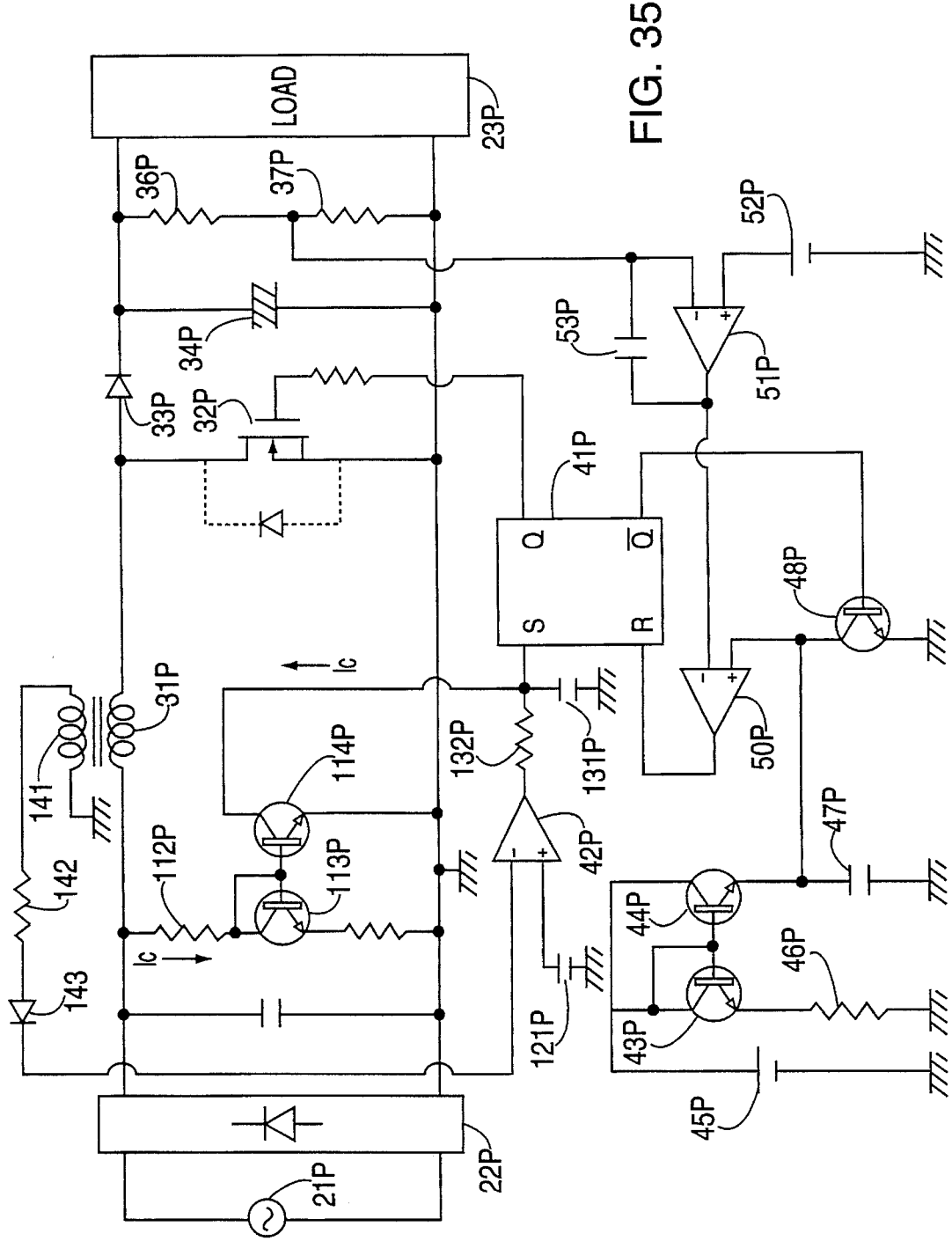
FIG. 35 is a circuit diagram of a modification of the tenth embodiment.

FIG. 35 illustrates a modification of the tenth embodiment which differs therefrom only in that the current flowing through the inductor 31P is sensed at the current sensor 42P by the use of a secondary winding 141 coupled to the inductor 31P instead of using the current sensing resistor.

That is, the secondary winding 141 induces a current proportional to the current flowing through the inductor 31P and therefore gives a corresponding voltage through a resistor 142 and a diode 143 to the current sensor 42P as indicative of the current through the inductor 31P. The other circuit configuration and operation are identical to the tenth embodiment. It is noted here that the above current sensing scheme of using the secondary winding 141 could be equally utilized in one or more of the previous embodiments and modifications where applicable.

What is claimed is:

1. A power supply comprising:

a fullwave rectifier for coupling to an AC power source to provide a rectified pulsating DC voltage from said AC power source;

a chopper including a switching element which is connected in series with an inductor across said rectifier, said switching element driven to turn on and off for providing a periodically interrupted voltage which is applied through a blocking diode across a smoothing capacitor to produce a smoothed DC voltage for driving a load, said inductor storing energy from said rectifier in response to said switching element being turned on and releasing said energy in response to said switching element being turned off by flowing a current through said inductor in a positive direction, said inductor cooperating with parasitic capacitance inherently present in said chopper to form an oscillation circuit which admits said current to flow through said inductor in a negative direction opposite to said positive direction;

current sensing means which senses said current flowing through said inductor and issues a start signal when said current decreases to a certain level;

a controller which responds to said start signal for turning on said switching element at a timing when said current flows in said negative direction and which subsequently turns off said switching element after a predetermined ON-period so as to release said current from said inductor, thereby causing said current to flow firstly in the negative direction and then in the positive direction through said inductor during said ON-period; and input current wave shaping means having a current compensator for controlling, in response to said pulsating DC voltage, at least one of the timing of turning said switching element on and off and the current flowing through said inductor so that an absolute value of a time integral of the current flowing continuously through said inductor in said negative direction during a first period is always smaller than an absolute value of a time integral of the current flowing continuously through said inductor in the positive direction during a second period immediately following said first period.

2. A power supply as set forth in claim 1, wherein the first and second periods occur during each of said ON-periods of said switching element, the first period occurring immediately after the turn on of said switching element.

3. A power supply as set forth in claim 1, wherein said input current wave shaping means operates said switching element in such a manner that said ON-period is greater as the level of said pulsating DC voltage from said rectifier becomes lower.

4. A power supply as set forth in claim 3, wherein said input current wave shaping means comprises:

a timing capacitor connected to said fullwave rectifier to be charged by said pulsating DC voltage from said rectifier at differing rates depending upon varying level of said pulsating DC voltage, a comparator comparing the voltage developed across said timing capacitor with a threshold voltage to issue an end signal when the voltage of said capacitor reaches said threshold voltage such that said end signal is issued later as the level of said pulsating DC voltage becomes lower, said controller turning off said switching element in response to said end signal, thereby extending said ON-period as the level of said pulsating DC voltage decreases.

5. A power supply as set forth in claim 3, wherein said input current wave shaping means comprises:

a timing capacitor connected to an auxiliary DC voltage source to be charged thereby at substantially a constant rate;

a voltage monitor monitoring said pulsating DC voltage so as to give a threshold voltage which varies in reverse proportion to said pulsating DC voltage, a comparator comparing the voltage developed across said timing capacitor with said varying threshold voltage to issue an end signal when the voltage of said capacitor reaches said threshold voltage such that said end signal is issued later as the level of said pulsating DC voltage becomes lower, said controller turning off said switching element in response to said end signal, thereby extending said ON-period as the level of said pulsating DC voltage decreases.

6. A power supply as set forth in claim 1, wherein said input current wave shaping means comprises:

at least one additional inductor connected in series with the inductor;

a bypass switch connected across said additional inductor;

a voltage monitor connected to said fullwave rectifier to give a monitored voltage indicative of said pulsating DC voltage;

comparator means comparing said monitored voltage with a predetermined reference voltage to produce a shunt signal when said monitored voltage decreases to said reference voltage, said shunt signal actuating to close said bypass switch so as to disconnect said additional inductor, thereby lowering the inductance of said chopper and therefore increasing the current flowing through the inductor in the positive direction during the ON-period of said switching element.

7. A power supply as set forth in claim 6, wherein a plurality of said additional inductors are connected in series with the inductor with a corresponding number of bypass switches connected respectively across said additional inductors;

said comparator means having a plurality of reference voltages of different levels to provide a corresponding number of said shunt signals when said monitored voltage decrease to said reference voltages, respectively, each of said shunt signals actuating to close corresponding one of said bypass switches, thereby lowering the inductance of said chopper in a stepwise manner as said pulsating DC voltage decreases.

8. A power supply as set forth in claim 1, wherein said input current wave shaping means comprises:

at least one additional inductor which is connected in series with the inductor;

at least one additional switching element, each additional switching element connected in series with each of the at least one additional inductor and in parallel with the series combination of the switching element and the inductor;

a voltage monitor connected to said fullwave rectifier to give a monitored voltage indicative of said pulsating DC voltage;

a selector connected to selectively enable one of the switching element and the at least one additional switching element;

a selector controller which actuates said selector to selectively enable one of the switching element and the at least one additional switching element depending upon the level of said monitored voltage in such a manner that one of the inductor and the at least one additional inductor is selected for storing the energy in order to decrease the inductance of said chopper and therefore increase said current flowing through the inductor as said monitored voltage decreases.

9. A power supply as set forth in claim 8, wherein a plurality of said additional inductors are connected in series with the inductor and wherein each of a corresponding number of additional switching elements is connected in parallel with the series combination of the inductor and the switching element or of one of the additional inductors and a corresponding one of the additional switching elements.

10. A power supply as set forth in claim 1, wherein said input current wave shaping means comprises:

a voltage monitor connected to said fullwave rectifier to give a monitored voltage indicative of said pulsating DC voltage; and adjustor means which varies the inductance of said inductor in such a manner as to increase the current flowing in said positive direction during the ON-period of said switching element as said monitored voltage decreases.

11. A power supply as set forth in claim 10, wherein said inductor is a saturable inductor magnetically coupled with a secondary winding, said secondary winding being connected in a series circuit loop of an auxiliary DC voltage source, a resistor, and a switch;

said switch being closed to flow a current through said secondary winding for lowering the inductance of said inductor in response to said monitored voltage decreasing to a predetermined level and opened otherwise to disconnect said secondary winding from said auxiliary DC voltage source.

12. A power supply as set forth in claim 10, wherein said inductor is a saturable inductor magnetically coupled with a secondary winding, said secondary winding being connected in series with an auxiliary DC voltage source, a resistor, and a bipolar transistor with said transistor connected to receive at its emitter said monitored voltage of said fullwave rectifier such that a current is caused to flow from said auxiliary DC voltage source through said secondary winding in a continuously increasing manner as said monitored voltage becomes lower, thereby lowering the inductance of said inductor to increase said current flowing through the inductor in said positive direction during the ON-period of said switching element.

13. A power supply as set forth in claim 1, wherein said input current wave shaping means comprises:

a current monitor which provides a monitored voltage indicative of said current flowing through said inductor;

a voltage monitor providing a varying reference voltage which is indicative of said pulsating DC voltage from said fullwave rectifier and which increases as said pulsating DC voltage decreases; and a comparator which compares said monitored voltage with said varying reference voltage to issue said start signal upon said monitored voltage decreasing to said reference voltage, whereby said controller responds to said start signal to turn on said switching element earlier as said pulsating DC voltage decreases in such a manner that said switching element is turned on at a timing immediately after said current flowing through said inductor decreases to zero irrespective of varying level of said pulsating DC voltage.

14. A power supply as set forth in claim 13, further including a secondary winding coupled to said inductor to produce an induced voltage as representative of said current flowing through the inductor, said induce voltage being fed to said comparator.

15. A power supply as set forth in claim 1, wherein said input current wave shaping means comprises:

a current monitor which provides a monitored voltage indicative of said current flowing through said inductor;

a voltage monitor providing a varying first voltage which is indicative of said pulsating DC voltage from said fullwave rectifier and which decreases as said pulsating DC voltage increases;

a comparator which compares said monitored first voltage with a predetermined level to issue said start signal when said current flowing through said inductor decreases to substantially zero level; and timing means receiving said start signal from said comparator and transferring said start signal to said controller with a delay of which duration decreases as said first voltage increases such that said controller responds to turn on said switching element earlier as said pulsating DC voltage decreases.

* * * * *

UNITED STATES PATENT AND TRADEMARK OFFICE
CERTIFICATE OF CORRECTION

PATENT NO. : 5,517,399
DATED : May 14, 1996
INVENTOR(S) : Tokushi YAMAUCHI, et al.

It is certified that error appears in the above-indentified patent and that said Letters Patent is hereby corrected as shown below:

Column 1, line 13, change "know" to --known--.

Column 1, line 32, change "receiving" to --receives--.

Column 3, line 9, change "turn" to --turned--.

Column 3, line 64, change "less" to --lesser--.

Column 4, line 16, change "$J1 \leq J2$" to --$J1 \geq J2$--.

Column 4, line 46, change "upon" to --when--.

Column 6, line 48, delete the first "duration".

Column 6, line 59, change "comprises" to --comprise--.

Column 6, line 61, change "alternately" to --alternatively--.

Column 9, line 14, change "t4'" to --t2'--.

Column 9, line 35, change "is" to --are--.

Column 9, line 39, delete "of".

Column 9, line 54, delete the comma after "64" and insert --and--.

UNITED STATES PATENT AND TRADEMARK OFFICE
CERTIFICATE OF CORRECTION

PATENT NO. : 5,517,399
DATED : May 14, 1996
INVENTOR(S) : Tokushi YAMAUCHI, et al.

It is certified that error appears in the above-indentified patent and that said Letters Patent is hereby corrected as shown below:

Column 11, line 57, change "transistor" to --transistors--.

Column 13, line 12, change "disclose" to --discloses--.

Column 13, line 28, change "decrease" to --decreases--.

Column 13, line 40, delete "that".

Column 13, line 41, after "pulsating" insert a comma.

Column 13, line 47, change "suitable" to --suitably--.

Column 13, line 63, change "for" to --to--.

Column 13, line 65, change "decrease" to --decreases--.

Column 14, line 35, after "flowing" insert --through--.

Column 15, line 21, after "response" insert --to--.

Column 15, line 42, change "decrease" to --decreases--.

Column 18, line 57, change "decrease" to --decreases--.

UNITED STATES PATENT AND TRADEMARK OFFICE
CERTIFICATE OF CORRECTION

PATENT NO. : 5,517,399
DATED : May 14, 1996
INVENTOR(S) : Tokushi YAMAUCHI, et al.

It is certified that error appears in the above-indentified patent and that said Letters Patent is hereby corrected as shown below:

Column 20, line 32, change "induce" to --induced--.

Column 20, line 49, between "which" and "duration" insert --the--.

Signed and Sealed this

Twenty-first Day of January, 1997

Attest:

BRUCE LEHMAN

*Attesting Officer*  *Commissioner of Patents and Trademarks*